US008216070B2

(12) United States Patent
Okamura

(10) Patent No.: US 8,216,070 B2
(45) Date of Patent: Jul. 10, 2012

(54) COMPUTER-READABLE STORAGE MEDIUM STORING INFORMATION PROCESSING PROGRAM AND INFORMATION PROCESSING DEVICE

(75) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1026 days.

(21) Appl. No.: 12/149,718

(22) Filed: May 7, 2008

(65) Prior Publication Data

US 2009/0209344 A1 Aug. 20, 2009

(30) Foreign Application Priority Data

Feb. 15, 2008 (JP) .................................. 2008-035144

(51) Int. Cl.
*A63F 9/24* (2006.01)
*A63F 13/02* (2006.01)
(52) U.S. Cl. ............... 463/36; 463/43; 463/31; 345/157
(58) Field of Classification Search .................. None
See application file for complete search history.

(56) References Cited

U.S. PATENT DOCUMENTS

| 7,424,388 B2* | 9/2008 | Sato ............................... 702/152 |
| 7,698,096 B2* | 4/2010 | Ohta ............................... 702/151 |
| 7,774,155 B2* | 8/2010 | Sato et al. ....................... 702/127 |
| 2007/0213109 A1* | 9/2007 | Sato et al. ........................... 463/3 |
| 2007/0265104 A1* | 11/2007 | Haga et al. ....................... 473/37 |
| 2008/0039200 A1 | 2/2008 | Yoshida |
| 2008/0119270 A1* | 5/2008 | Ohta ............................... 463/37 |
| 2008/0177497 A1* | 7/2008 | Ohta ............................... 702/141 |
| 2008/0255795 A1* | 10/2008 | Shkolnikov .................... 702/141 |
| 2009/0005166 A1* | 1/2009 | Sato ............................... 463/37 |
| 2009/0036213 A1* | 2/2009 | Masuyama et al. ............ 463/37 |
| 2009/0062006 A1* | 3/2009 | Ikeda .............................. 463/37 |
| 2010/0149132 A1* | 6/2010 | Iwase et al. .................... 345/175 |
| 2010/0149134 A1* | 6/2010 | Westerman et al. ........... 345/179 |
| 2010/0309370 A1* | 12/2010 | Ueshima et al. ............... 348/371 |
| 2011/0021274 A1* | 1/2011 | Sato et al. ....................... 463/31 |
| 2011/0063216 A1* | 3/2011 | Orr et al. ........................ 345/158 |
| 2011/0086708 A1* | 4/2011 | Zalewski et al. ................ 463/36 |

FOREIGN PATENT DOCUMENTS

| EP | 1 852 163 | 11/2007 |
| EP | 1 886 718 | 2/2008 |
| JP | 2007-300973 | 11/2007 |

* cited by examiner

*Primary Examiner* — Melba Bumgarner
*Assistant Examiner* — George Howarah
(74) *Attorney, Agent, or Firm* — Nixon & Vanderhye P.C.

(57) ABSTRACT

A repeated determination of a magnitude of a change amount vector with respect to a first threshold value is made. When it is determined that the magnitude is equal to or larger than the first threshold value, predetermined processing is executed, a swinging direction in which an input device is swung is calculated, and intersection of the swinging direction with a second threshold value is determined. After it is determined that the change amount vector intersects with the second threshold value, further, whether or not the magnitude of the change amount vector is smaller than a third threshold value is determined. After the magnitude of the change amount vector is determined to be equal to or larger than the first threshold value, the first threshold is not tested again until the magnitude of the change amount vector is smaller than the third threshold value.

17 Claims, 23 Drawing Sheets

//COMPUTER-READABLE STORAGE MEDIUM STORING INFORMATION PROCESSING PROGRAM AND INFORMATION PROCESSING DEVICE

CROSS REFERENCE TO RELATED APPLICATION

The disclosure of Japanese Patent Application No. 2008-035144, filed on Feb. 15, 2008, is incorporated herein by reference.

FIELD

The technology herein relates to information processing in which predetermined processing is executed based on acceleration data, and more particularly, to information processing in which processing is executed based on acceleration data which is outputted from an acceleration sensor for detecting acceleration in at least two axial directions which is applied to an input device.

BACKGROUND AND SUMMARY

Conventionally, there has been known a game apparatus using an input device including an acceleration sensor. For example, there has been known a game program in which a player performs a "swing" motion of the input device and a game progresses, and the like.

When the player swings the above input device, the motion speeds up at the beginning of the swing, and speeds down at the end of the swing. Thus, after acceleration is generated in the input device in the same direction as the swinging direction at the beginning of the swing, the magnitude of the acceleration gradually decreases, and acceleration is generated in the input device in a direction opposite to the swinging direction at the end of the swing.

For that reason, concerning a determination of a "swing" motion, for example, in the case of determining occurrence of a swing motion when acceleration exceeds a predetermined threshold value, a determination is made as to whether acceleration in the same direction as the swinging direction exceeds the predetermined threshold value, and a determination is also made as to whether acceleration in a direction opposite to the swinging direction exceeds the predetermined threshold value. In other words, a determination is made twice as to whether acceleration exceeds the predetermined threshold value. As a result, even when the player intends to perform one "swing" motion, two "swing" motions may be detected.

In view of such inconvenience, a technique is disclosed, in which within a predetermined time period from a time when acceleration of an input device exceeds a predetermined threshold value, even if the acceleration exceeds the threshold value again, it is not detected as a "swing" motion (e.g. Japanese Laid-Open Patent Publication No. 2007-300973).

However, a program disclosed in Japanese Laid-Open Patent Publication No. 2007-300973 has problems as follows. In the case where the above predetermined time period from the time when the acceleration exceeds the predetermined threshold value is set long, when a player consecutively performs "swing" motions for a short time period, occurrence of "swings" is not accurately detected. In other words, in the case where the above predetermined time period is set as 2 seconds, when the player performs a "swing" motion five times for a short time period, i.e., 2 seconds, "swings" are not detected during the predetermined time period, and only one "swing" is detected in game processing. On the other hand, in the case where the predetermined time period is set short, wrong detection occurs due to acceleration in the direction opposite to the swinging direction as described above.

Therefore, an object of certain example embodiments provide a computer-readable storage medium storing an information processing program and an information processing device, each of which is capable of more accurately detecting a "swing" motion of an input device including an acceleration sensor.

Certain example embodiments include the following features to attain the object mentioned above. It is noted that reference characters and supplementary explanations in parentheses are merely provided to facilitate the understanding of certain example embodiments in relation to later-described embodiments, rather than limiting the scope of the present invention in any way.

A first aspect is a computer-readable storage medium storing an information processing program executed by a computer of an information processing device which executes processing based on acceleration data which is outputted from an acceleration sensor which detects acceleration in at least two axial directions which is applied to an input device. The information processing program causing the computer to function as acceleration data obtaining means (S31), change amount vector calculation means (S32, S34), first determination means (S27), processing execution means (S28), swinging direction calculation means (S3), second threshold value setting means (S4), second determination means (S4), and third determination means (S5). The acceleration data obtaining means obtains the acceleration data at a unit time interval. The change amount vector calculation means calculates, based on the acceleration data obtained by the acceleration data obtaining means, a change amount vector indicative of a change amount of acceleration. The first determination means determines at the unit time interval whether or not a magnitude of the change amount vector calculated by the change amount vector calculation means is equal to or larger than a first threshold value. The processing execution means executes predetermined processing when the first determination means determines that the magnitude of the change amount vector is equal to or larger than the first threshold value. When the first determination means determines that the magnitude of the change amount vector is equal to or larger than the first threshold value, the swinging direction calculation means calculates a swinging direction in which the input device is swung based on the change amount vector. After the swinging direction calculation means calculates the swinging direction, the second threshold value setting means sets at least one second threshold value in a direction opposite to the swinging direction. The second determination means determines whether or not the change amount vector intersects with the second threshold value. After the second determination means determines that the change amount vector intersects with the second threshold value, the third determination means determines whether or not the magnitude of the change amount vector is smaller than a third threshold value which is equal to or smaller than the first threshold value. When the first determination means determines that the magnitude of the change amount vector is equal to or larger than the first threshold value, the first determination means waits for the third determination means to determine that the magnitude of the change amount vector is smaller than the third threshold value, and then restarts the determination which is made at the unit time interval as to whether or not the magnitude of the change amount vector is larger than the first threshold value.

According to the first aspect, one swing motion which a player intends can be prevented from being wrongly detected as two swing motions.

In a second aspect based on the first aspect, the second threshold value setting means sets the second threshold value to be a value indicated as a straight line or a plane perpendicular to the swinging direction in a space based on a number of dimensions of the change amount vector. The second determination means determines whether or not a straight line indicated by the change amount vector intersects with the straight line or the plane perpendicular to the swinging direction in the space.

In a third aspect based on the second aspect, the second threshold value setting means sets the second threshold value to be the value indicated as the straight line or the plane which is located in a position distant from an origin in the space and in a direction opposite to the swinging direction.

According to the second or third aspect, the same advantageous effect as the first aspect can be obtained.

In a fourth aspect based on the first aspect, the swinging direction calculation means regards as the swinging direction a direction indicated by the change amount vector when the first determination means determines that the magnitude of the change amount vector is equal to or larger than the first threshold value.

In a fifth aspect based on the first aspect, when the first determination means determines that the magnitude of the change amount vector is equal to or larger than the first threshold value, the swinging direction calculation means regards as the swinging direction a direction indicated by a change amount vector based on acceleration data which is obtained after a predetermined time period elapses from a time of the determination.

In a sixth aspect based on the first aspect, the swinging direction calculation means includes combination vector calculation means (S55) for when the first determination means determines that the magnitude of the change amount vector is equal to or larger than the first threshold value, combining change amount vectors for a predetermined time period from a time of the determination to calculate a combination vector. The swinging direction calculation means regards a direction indicated by the combination vector as the swinging direction.

According to any of the fourth to sixth aspects, the swinging direction can be calculated more accurately.

In a seventh aspect based on the first aspect, the second threshold value setting means sets the second threshold value to be a value in accordance with the magnitude of the change amount vector when the first determination means determines that the magnitude of the change amount vector is equal to or larger than the first threshold value.

According to the seventh aspect, one swing motion can be prevented from being wrongly detected as two swing motions in accordance with strength of a swing by the player.

In an eighth aspect based on the first aspect, the information processing program further causes the computer to function as threshold value increase means (S21) for increasing the first threshold value in accordance with the magnitude of the change amount vector at a predetermined timing.

According to the eighth aspect, the determination as to whether or not the magnitude of the change amount vector is equal to or larger than the first threshold value can be prevented from being continuously made despite player's intention.

In a ninth aspect based on the eighth aspect, the information processing program further causes the computer to function as decrease means (S42) for gradually decreasing the first threshold value as time passes after the threshold value increase means increases the first threshold value.

According to the ninth aspect, an effect caused by a different manner of swinging by each player can be reduced.

In a tenth aspect based on the first aspect, the second determination means calculates an inner product between the change amount vector and the swinging direction, and compares the inner product with the second threshold value to determine whether or not the change amount vector intersects with the second threshold value.

According to the tenth aspect, a processing burden on the computer can be reduced.

An eleventh aspect is an information processing device for executing processing based on acceleration data which is outputted from an acceleration sensor which detects acceleration in at least two axial directions which is applied to an input device. The information processing device comprises acceleration data obtaining means (10), change amount vector calculation means (10), first determination means (10), processing execution means (10), swinging direction calculation means (10), second threshold value setting means (10), second determination means (10), and third determination means (10). The acceleration data obtaining means (10) obtains the acceleration data at a unit time interval. The change amount vector calculation means calculates, based on the acceleration data obtained by the acceleration data obtaining means, a change amount vector indicative of a change amount of acceleration. The first determination means determines at the unit time interval whether or not a magnitude of the change amount vector calculated by the change amount vector calculation means is equal to or larger than a first threshold value. The processing execution means executes predetermined processing when the first determination means determines that the magnitude of the change amount vector is equal to or larger than the first threshold value. When the first determination means determines that the magnitude of the change amount vector is equal to or larger than the first threshold value, the swinging direction calculation means calculates a swinging direction in which the input device is swung based on the change amount vector. After the swinging direction calculation means calculates the swinging direction, the second threshold value setting means sets at least one second threshold value in a direction opposite to the swinging direction. The second determination means determines whether or not the change amount vector intersects with the second threshold value. After the second determination means determines that the change amount vector intersects with the second threshold value, the third determination means determines whether or not the magnitude of the change amount vector is smaller than a third threshold value which is equal to or smaller than the first threshold value. When the first determination means determines that the magnitude of the change amount vector is equal to or larger than the first threshold value, the first determination means waits for the third determination means to determine that the magnitude of the change amount vector is smaller than the third threshold value, and then restarts the determination which is made at the unit time interval as to whether or not the magnitude of the change amount vector is larger than the first threshold value.

According to the eleventh aspect, the same advantageous effect as the first aspect can be obtained.

According to the eleventh aspect, a "swing" motion of the input device including the acceleration sensor can be detected more accurately.

These and other objects, features, aspects and advantages of certain example embodiments will become more apparent from the following detailed description when taken in conjunction with the accompanying drawings.

DESCRIPTION OF THE PREFERRED EMBODIMENTS

The following describes embodiments with reference to the drawings. It is noted that the present invention is not limited by the embodiment.

(Whole Configuration of Game System)

Figure 1:
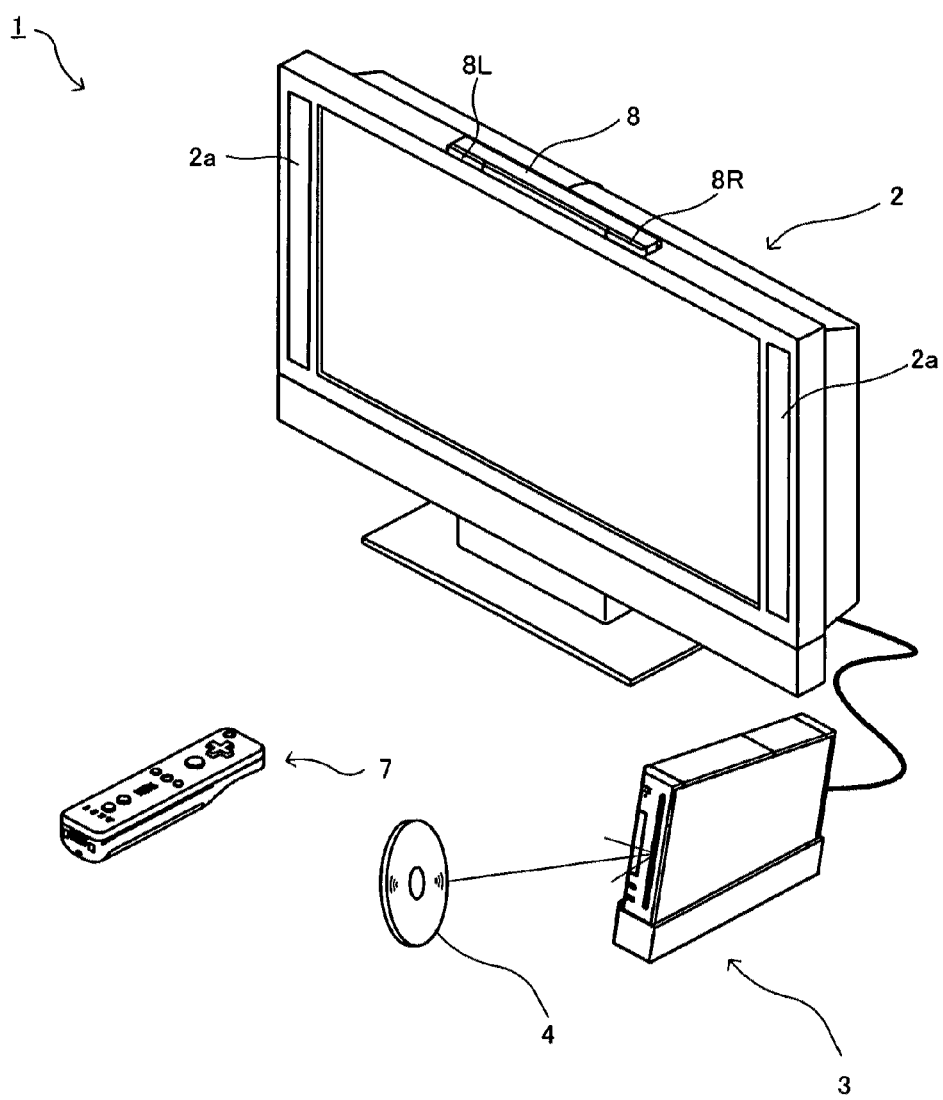
FIG. 1 is an external view of a game system 1 according to an embodiment.

With reference to FIG. 1, the following will describe a game system 1 including a game apparatus according to certain example embodiments. FIG. 1 is an external view of the game system 1. Hereinafter, the game system 1 using a stationary game apparatus will be used as an example, and the game apparatus and a game program according to the present embodiment will be described. As shown in FIG. 1, the game system 1 includes a television receiver (hereinafter, referred to merely as a television) 2, a game apparatus 3, an optical disc 4, a controller 7, and a marker section 8. The game system 1 executes game processing at the game apparatus 3 in accordance with a game operation using the controller 7.

The optical disc 4 as an example of an exchangeable information storage medium replaceably used with respect to the game apparatus 3 is detachably inserted in the game apparatus 3. The optical disc 4 stores a game program which is to be executed by the game apparatus 3. The game apparatus 3 has at its front surface an insertion slot. The game apparatus 3 reads and executes the game program stored in the optical disc 4 which is inserted in the insertion slot for executing the game processing.

The television 2 as an example of a display device is connected to the game apparatus 3 via a connection cord. The television 2 displays game images which are obtained as the result of the game processing executed by the game apparatus 3. The marker section 8 is mounted adjacent to the screen of the television 2 (on the upper surface of the screen in FIG. 1). The marker section 8 has at its opposite ends a marker 8R and a marker 8L, respectively. The marker 8R has one or more infrared LEDs which output infrared lights forward from the television 2. The marker 8L has the same configuration as the marker 8R. The marker section 8 is connected to the game apparatus 3, and the game apparatus 3 is capable of controlling illumination of each infrared LED of the marker section 8.

The controller 7 is an input device which provides the game apparatus 3 with operation data which indicates contents of an operation made to the controller 7. The controller 7 is connected to the game apparatus 3 by radio communication. In the present embodiment, the technology of, for example, Bluetooth (registered trademark), is used for the radio communication between the controller 7 and the game apparatus 3. It is noted that in an alternative embodiment, the controller 7 may be connected to the game apparatus 3 via a wire.

(Internal Configuration of Game Apparatus 3)

Figure 2:
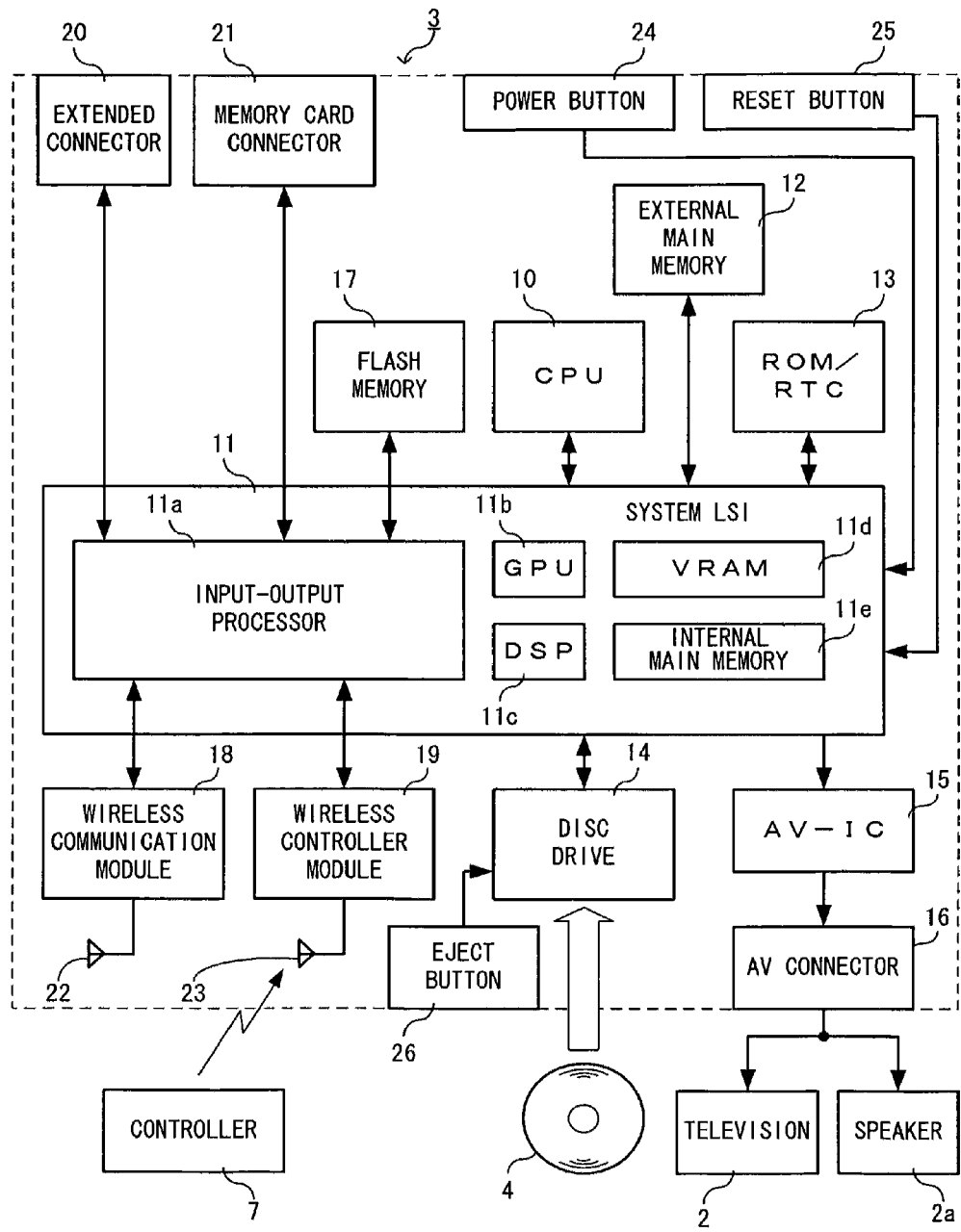
FIG. 2 is a functional block diagram of a game apparatus 3 in FIG. 1.

The following will describe an internal configuration of the game apparatus 3 with reference to FIG. 2. FIG. 2 is a block diagram showing a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (so-called boot ROM) which stores a program for starting up the game apparatus 3, and a clock circuit (RTC: Real Time Clock) for counting time. The disc drive 14 reads program data and texture data from the optical disc 4, and writes these data into an internal main memory 11e, which will be described later, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms a part of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and processing of rendering such as attaching texture, thereby generating game image data. In addition to the graphics command, the CPU 10 provides the GPU 11b with an image generation program required for generating the game image data. The VRAM 11d stores data, such as polygon data, texture data, and the like, which are required for the GPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work region and a buffer region for the CPU 10.

The image data and the sound data generated thus are read by the AV-IC 15. The AV-IC 15 outputs the image data to the television 2 via an AV connector 16, and the sound data to a speaker 2a built in the television 2. Thus, an image is displayed on the television 2, and sound is outputted from the speaker 2a.

The input-output processor (I/O process) 11a performs transmission and reception of data to and from each component connected to the input-output processor 11a, and downloads data from an external device. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus 3 and the other game apparatus and various servers, the flash memory 17 may store saved data (result data or midstream data of the game) of the game played using the game apparatus 3.

The input-output processor 11a receives operation data transmitted from the controller 5 via the antenna 23 and the wireless controller module 19, and stores (temporarily stores) the operation data in the buffer region of the internal main memory 11e or the external main memory 12.

In addition, the extended connector 20 and the memory card connector 21 are connected to the input-output processor 11a. The extended connector 20 is a connector for an interface such as USB and SCSI, and the communication with the network is enabled by connecting a medium such as an external storage medium, a peripheral device such as another controller, or a wired connector for communication to the extended connector 20 instead of the wireless communication module 18. The memory card connector 21 is a connector for connecting thereto an external storage medium such as a memory card. For example, the input-output processor 11a accesses the external storage medium via the extended connector 20 and the memory card connector 21 for storing data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 via an AC adaptor (not shown). In the state where the power has been turned on, the power button 24 is pressed to shift to a low power standby mode. Even in the low power standby mode, electric power is supplied to the game apparatus 3. Even in the low power standby mode, electric power is supplied to the game apparatus 3. Thus, the game apparatus 3 can be always connected to a network such as the Internet. It is noted that in turning off the power once the power is turned on, the power button 24 is pressed for a predetermined period of time or longer to turn off the power. The reset button 25 is pressed to cause the system LSI 11 to restart a boot program of the game apparatus 3. The eject button 26 is connected to the disc drive 14. The eject button 26 is pressed to eject the optical disc 4 from the disc drive 14.

Figure 3:
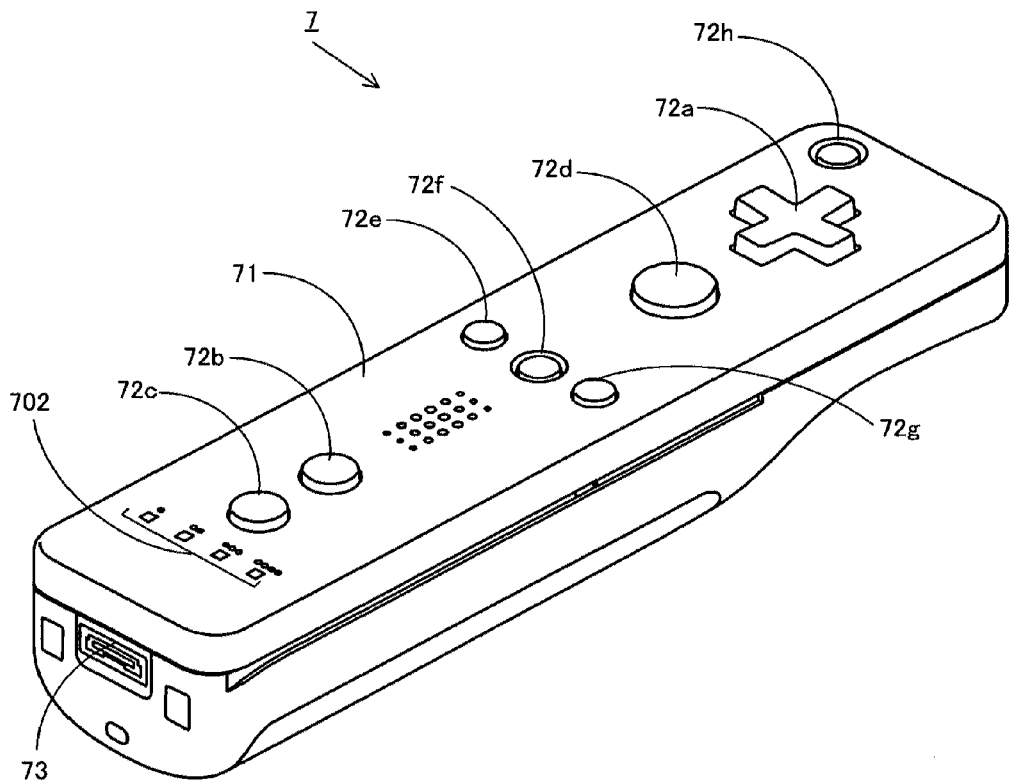
FIG. 3 is a perspective view of a controller 7 in FIG. 1 seen from a top rear side thereof.
Figure 3:
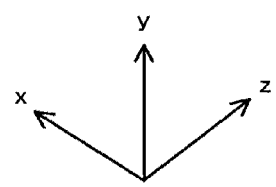
Figure 4:
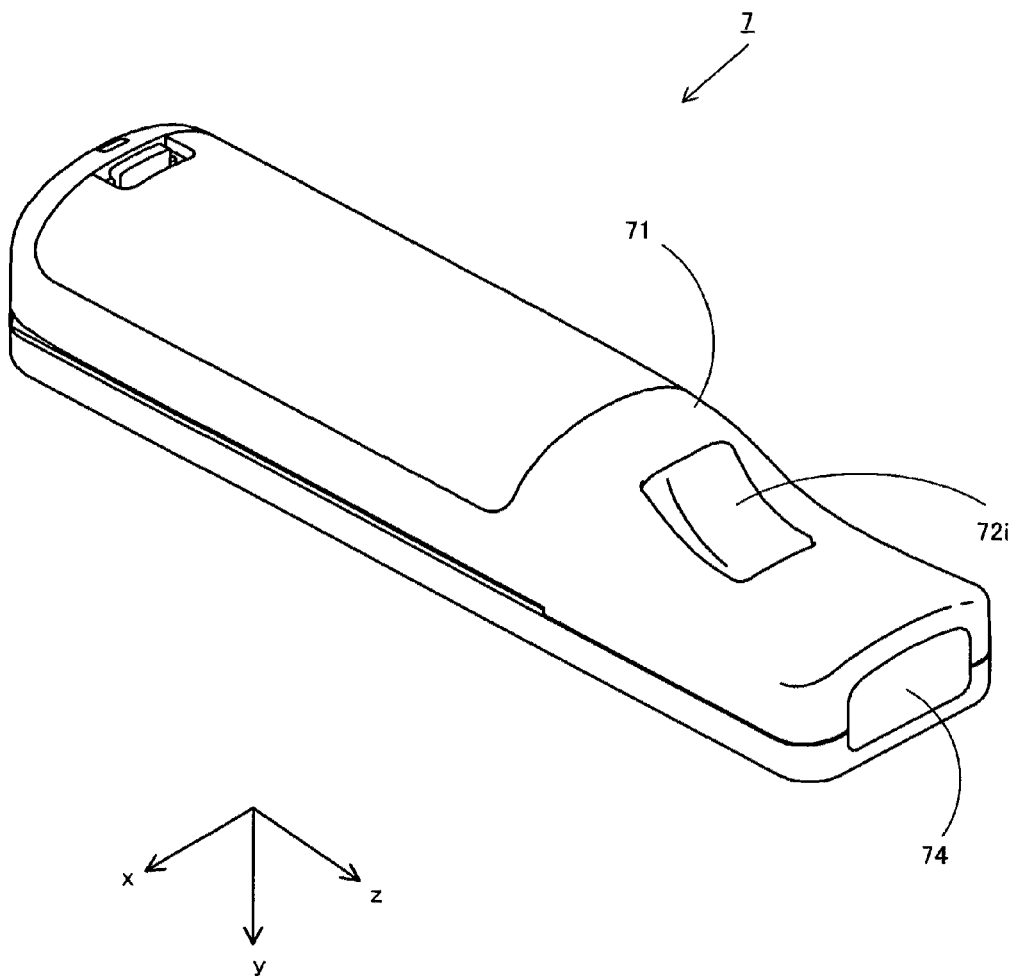
FIG. 4 is a perspective view of the controller 7 in FIG. 3 seen from a bottom front side thereof.

The following will describe the controller 7 with reference to FIGS. 3 and 4. FIG. 3 is a perspective view of the controller 7 seen from a top rear side thereof, and FIG. 4 is a perspective view of the controller 7 seen from a bottom front side thereof.

As shown in FIGS. 3 and 4, the controller 7 includes a housing 71 and an operation section 72 including a plurality of operation buttons which are provided on surfaces of the housing 71. The housing 71 of the embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player of the controller type which is currently set for the controller 7. More specifically, when the controller 7 transmits transmission data to the game apparatus 3, one of the plurality of LEDs 702 which corresponds to the controller type of the controller 7 is lit up.

On the top surface of the housing 71, a plurality of holes is provided between the operation button 72b and the operation buttons 72e to 72g for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 such that the front surface thereof faces the makers 8L and 8R. On a slope surface of the recessed portion, an operation button 72i is provided. The operation button 72i is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a is provided) is a positive direction of y-axis. The left-right direction of the controller 7 corresponds to x-axis, and the direction toward the right side surface housing 71 (the side surface which is not shown in FIG. 3 but shown in FIG. 4) is a positive direction of x-axis.

Figure 5:
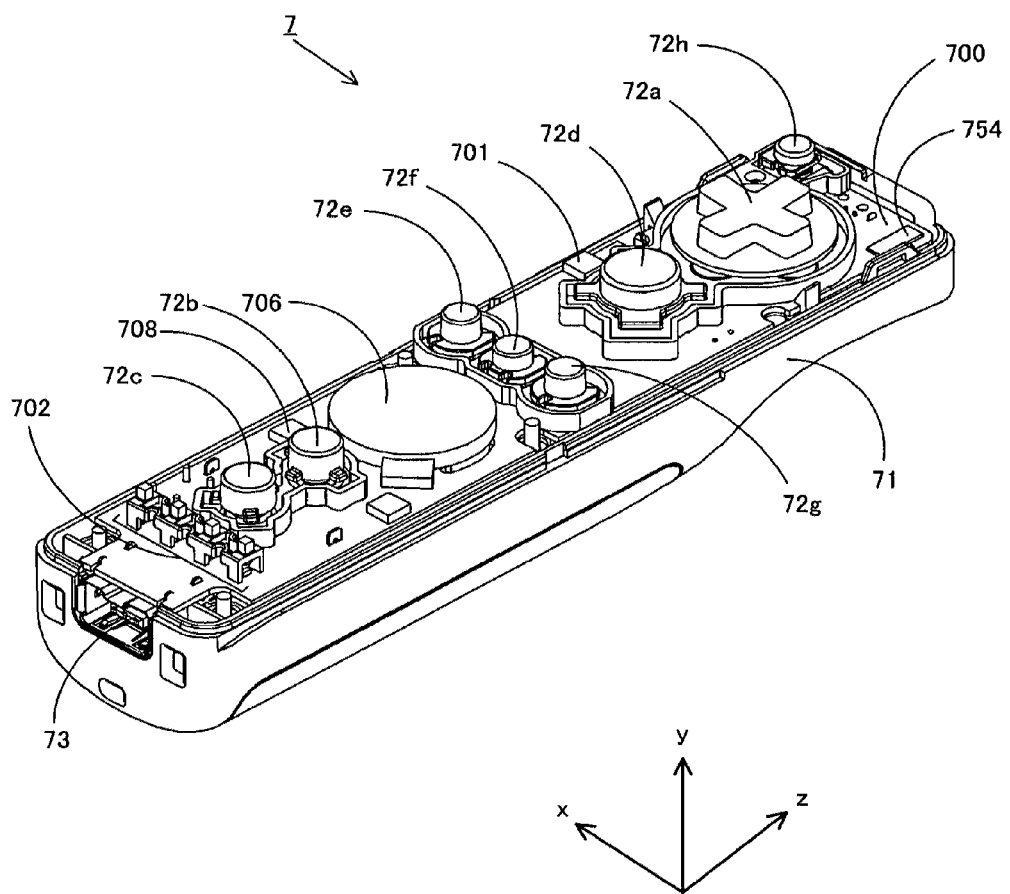
FIG. 5 is a perspective view illustrating a state where an upper housing of the controller 7 in FIG. 3 is removed.
Figure 6:
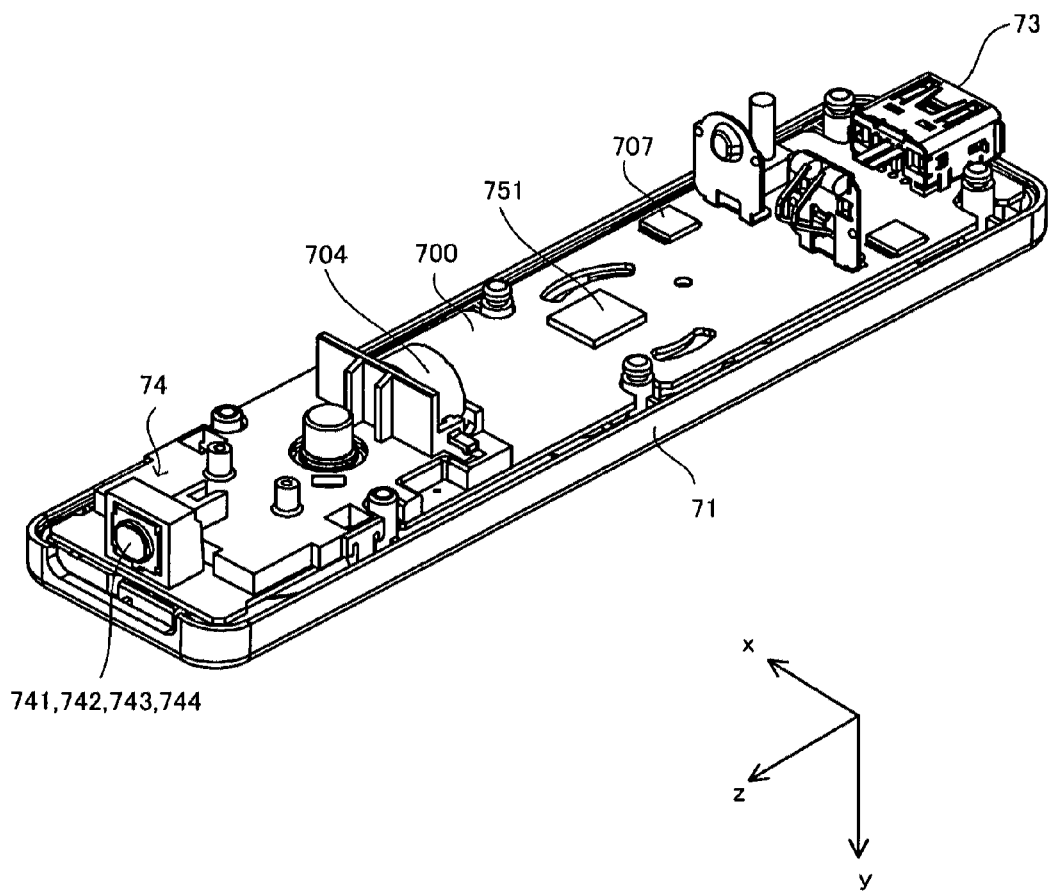
FIG. 6 is a perspective view illustrating a state where a lower housing of the controller 7 in FIG. 3 is removed.

The following will describe an internal configuration of the controller 7 with reference to FIGS. 5 and 6. FIG. 5 is a perspective view illustrating a state where an upper housing (a part of the housing 71) of the controller 7 is removed as seen from a rear side thereof. FIG. 6 is a perspective view illustrating a state where a lower housing (a part of the housing 71)

of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751, and the like (see FIGS. 6 and 7) by lines (not shown) formed on the substrate 700 and the like. The microcomputer 751 as an example of button data generation means functions to generate operation button data in accordance with a type of the operation button 72a and the like. This function is a known technique, and achieved, for example, by the microcomputer 751 detecting contact/non-contact of the line by a switch mechanism such as a tact switch located below a keytop. More specifically, the operation button is pressed to contact with the line, thereby conducting a current therethrough. The microcomputer 751 detects which operation button the line, in which the current conduction occurs, leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated and unactuated in accordance with vibration data transmitted from the game apparatus 3. The controller 7 is vibrated by an actuation of the vibrator 704, and the vibration is conveyed to the player holding the controller 7. Thus, a so-called vibration-feedback game is realized. Since the vibrator 704 is located in the front portion of the housing 71, the housing 71 is vibrated substantially, and hence the player holding the controller 7 easily feels the vibration.

Figure 7:
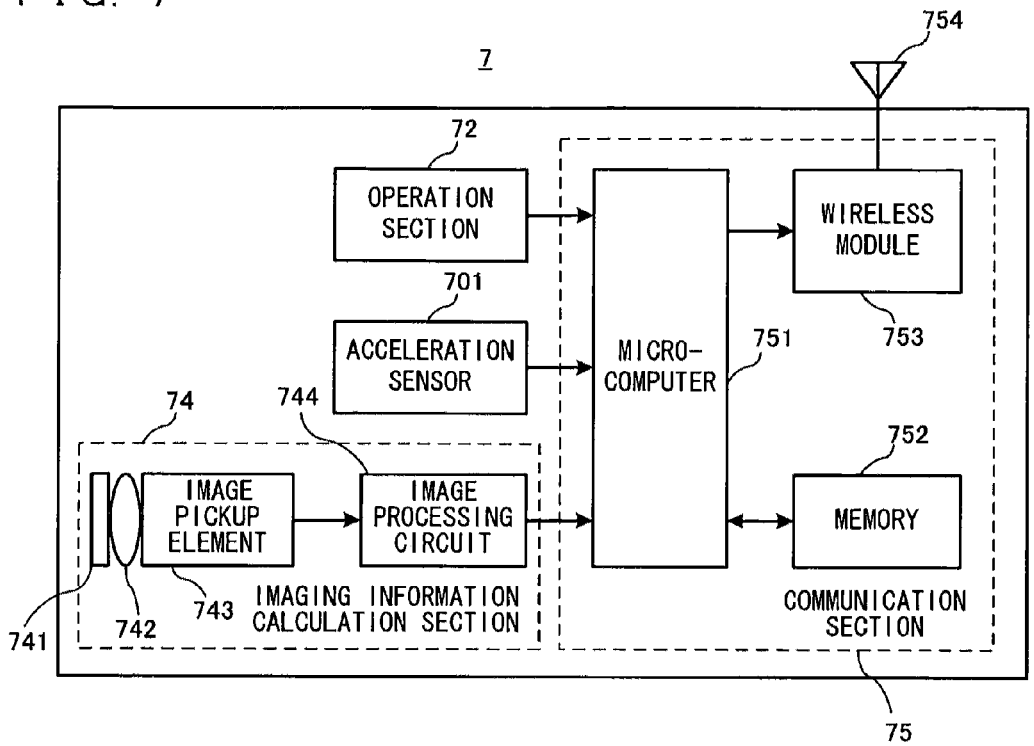
FIG. 7 is a block diagram illustrating an internal configuration of the controller in FIG. 3.

The following will describe an internal configuration of the controller 7 with reference to FIG. 7. FIG. 7 is a block diagram showing the internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs to the communication section 75 process result data indicating, e.g., a calculated coordinate position, square measure of the area. The imaging information calculation section 74 is fixed to the housing 71 of the controller 7. An imaging direction of the imaging information calculation section 74 can be changed by changing a facing direction of the housing 71. As described later in detail, a signal corresponding to a position and motion of the controller 7 is obtained in accordance with the process result data outputted from the imaging information calculation section 74.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micro-machined MEMS (microelectromechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the one, two or three axes thereof. As a result, the acceleration sensor 701 cannot directly detect movement along a non-linear (e.g. arcuate) path, rotation, rotational movement, angular displacement, inclination, position, attitude or any other physical characteristic.

However, through processing by a computer such as the processor of the game apparatus (e.g. the CPU 30) or the processor of the controller 7 or the subunit 76 (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing. In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration).

In an alternative embodiment, a gyro-sensor of any suitable technology incorporating, for example, a rotating or vibrating element may be used as a sensor for detecting motion of the controller 7. Exemplary MEMS gyro-sensors which may be used in this embodiment are available from Analog Devices, Inc. Unlike the linear acceleration sensor 701, a gyro-sensor is capable of directly detecting rotation (or angular rate) around an axis defined by the gyroscopic element (or elements) therein. Thus, due to the fundamental differences between a gyro-sensor and a linear acceleration sensor, corresponding changes need to be made to the processing operations which are performed on the output signals from these devices depending on which device is selected for a particular application.

Specifically, when a gyro-sensor is used instead of an acceleration sensor to calculate inclination and attitude, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tile previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also very different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus 3 via the antenna 754. The sound IC 707 processes the sound data and the like transmitted from the game apparatus 3 via the communication section 75. The microcomputer 751 actuates the vibrator 704 in accordance with the vibration data (e.g. signals for actuating and unactuating the vibrator 704) transmitted from the game apparatus 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the process result data from the imaging information calculation section 74 are outputted to the microcomputer 751. The microcomputer 751 temporarily stores the input data (the key data, the acceleration data, and the process result data) in the memory 752 as the transmission data which is to be transmitted to the wireless controller module 19. The wireless transmission from the communication section 75 to the wireless controller module 19 is performed periodically at a predetermined time interval. Since game process is generally performed at a cycle of 1/60 sec., data needs to be collected and transmitted at a cycle of a shorter time period. Specifically, the game process unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth (registered trademark) technology to modulate the operation data onto a carrier wave of a predetermined frequency and to radiate the resultant radio signal from the antenna 754. Thus, the key data from the operation section 72 provided in the controller 7, acceleration data from the acceleration sensor 701, and the process result data from the imaging information calculation section 74 are modulated onto the radio signal by the wireless module 753 and radiated from the controller 7. The wireless controller module 19 of the game apparatus 3 receives the radio signal, and the game apparatus 3 demodulates or decodes the radio signal to obtain the series of operation information (the key data, the acceleration data, and the process result data). Based on the obtained operation information and the game program, the CPU 10 of the game apparatus 3 performs the game processing. In the case where the communication section 75 is structured using the Bluetooth (registered trademark) technology, the communication section 75 can have a function of receiving transmission data which is wirelessly transmitted from the other devices.

The following will describe an outline of a game assumed in the embodiment, which is a musical performance game in which a player becomes a conductor of an orchestra for conducting the orchestra. Although not shown in the drawings, an image as viewed from the conductor standing on a podium is displayed as a game image. In other words, an image which shows a lot of musical performer objects each holding a musical instrumental is displayed on the television 2.

Figure 8:
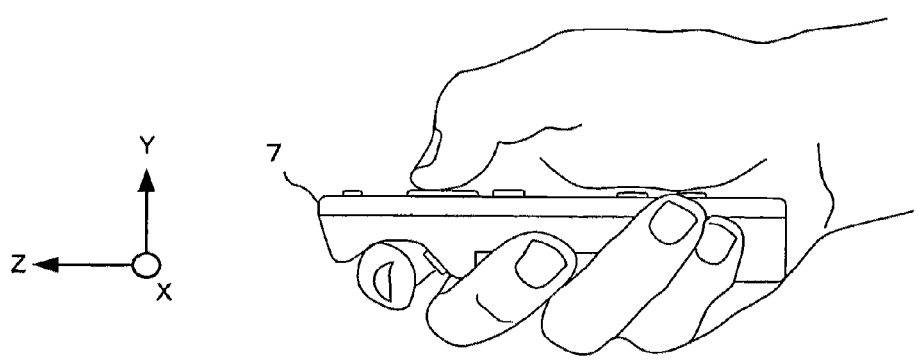
FIG. 8 shows an example of a manner of holding the controller 7.

The following will describe an operation of the game. In the game, the player uses the controller 7 like a baton of the conductor. For example, the player holds the controller 7 as shown in FIG. 8, and swings the controller 7 as if the player swings a baton. For example, when a music piece in triple time is performed, the player swings the controller 7 so as to draw a triangle (namely, a figure indicating triple time) in a space using the baton. Thus, in accordance with the swing of the controller 7, a predetermined music piece is reproduced. While the music piece is reproduced, an image (animation) in which musical performer objects play musical instrumentals is displayed as a game image. In other words, in accordance with the swing of the controller 7 by the player, the musical performer objects play musical instrumentals, and the music piece is reproduced.

Further, in the game, a time period for reproducing a music piece in accordance with one swing motion of the controller 7 (a reproduction time period) is predetermined. For example, in the game, the music piece is reproduced for a time period equivalent to one bar per one swing (which corresponds to a motion for one beat). Thus, when performing an operation as if swinging the baton in quadruple time, the player swings the controller 7 so as to draw a figure indicating quadruple time in a space. It is assumed that reproduction (swing) is started at the beginning of the music piece and the swing of the controller 7 is stopped at the second beat of quadruple time. In this case, the music piece is reproduced from the beginning to a second bar thereof, and the reproduction stops there. When the swing of the controller 7 is stopped at the third beat of quadruple time, the music piece is reproduced to a third bar thereof, and the reproduction stops there (it is noted that at that time, an image, in which each musical performer object which stops playing the musical instrument looks at the player, is displayed as a game image). In other words, when the swing of the controller 7 continues, the reproduction of the music piece continues without interruption. However, when the swing of the controller 7 is stopped in midstream, the reproduction of the music piece is stopped. Further, when the swing is restarted, the stopped music piece is reproduced from the stopped part thereof. For example, in the case where the swing of the controller 7 is stopped at the second beat and then restarted, the music piece is reproduced to the second bar thereof, and the reproduction is stopped once. Then, in accordance with the restart of the swing of the controller 7, the music piece is reproduced from the third bar thereof. Accordingly, certain example embodiments accurately detect an operation of "one swing".

Figure 9:
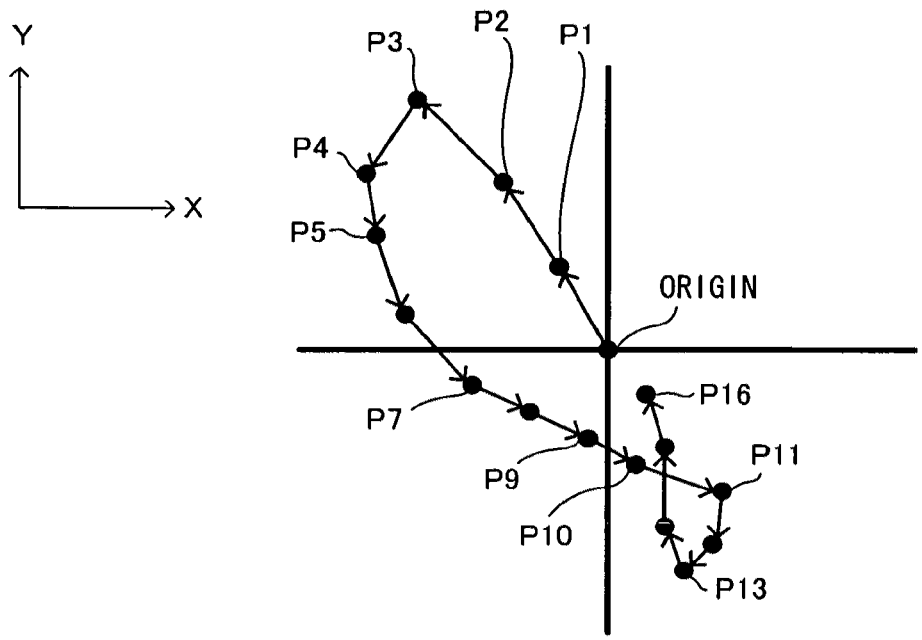
FIG. 9 is a view for explaining a principle for swing operation detection processing according to certain example embodiments.

The following will describe a principle (a concept) for detecting an operation of "one swing" with reference to FIGS. 9 to 16. FIG. 9 is an example of a graph in which positive or negative and magnitudes of acceleration indicated by X-axis and Y-axis acceleration data concerning an operation of "one swing" are shown on X-axis and Y-axis. In FIG. 9, acceleration indicated by X-axis and Y-axis acceleration data which are obtained concurrently at a predetermined time period (e.g. for each one frame (every 1/60 sec.)) is plotted in an X-Y coordinate system. In FIG. 9, acceleration obtained by combining acceleration indicated by the concurrently obtained X-axis and Y-axis acceleration data is indicated as a point Pn (n is an integer), the points Pn are connected to each other by arrows in order in which data are obtained. Further, in FIG. 9, a value of acceleration data in a state where acceleration including gravitational acceleration is not applied to the acceleration sensor 701 is indicated as an origin, (X,Y)=(0,0).

When the player holds and swings the controller 7, the motion speeds up at the beginning of the swing, and speeds down at the end of the swing as described above. Thus, after acceleration is generated in the controller 7 in the same direction as the swinging direction (in an obliquely upward left direction in FIG. 9) at the beginning of the swing, a magnitude of the acceleration gradually decreases, and acceleration (hereinafter, referred to as reverse acceleration) is generated in the controller 7 in a direction opposite to the swinging direction (in an obliquely downward right direction in FIG. 9) at the end of the swing. In FIG. 9, a position at which the swing is started is set as the origin, the point P shifts in the obliquely upward left direction (points P1 to P3), and then shifts from the point P3 in the obliquely downward right direction so as to draw a locus counterclockwise (in FIG. 9, the acceleration which shifts in the obliquely downward right direction after crossing the X-axis corresponds to the reverse acceleration, namely, the acceleration after a point P7). Further, the point P shifts in a downward direction (points P11 to P13), and then returns to the origin (the point P13 to P16).

Figure 10:
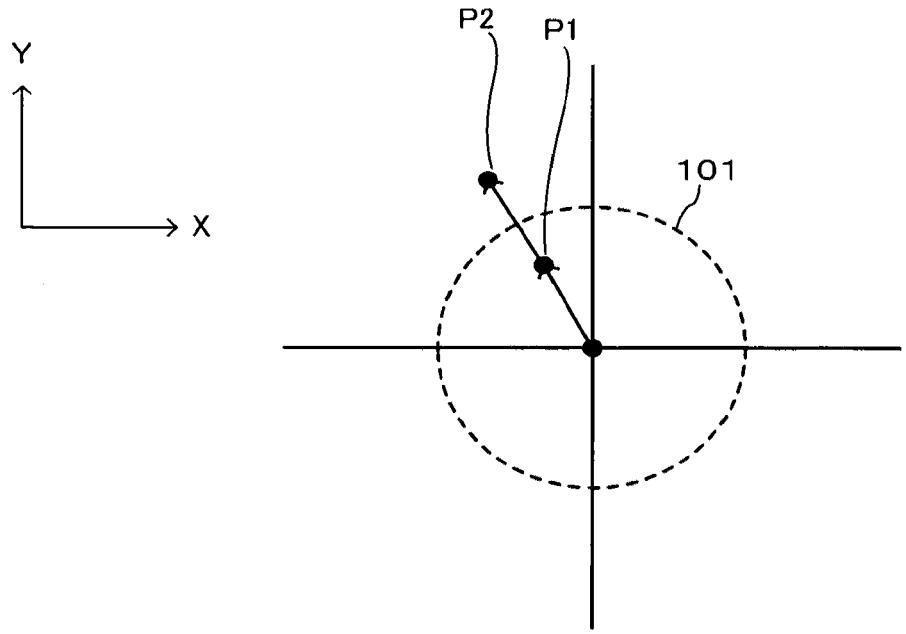
FIG. 10 is a view for explaining the principle for the swing operation detection processing according to certain example embodiments.
Figure 11:
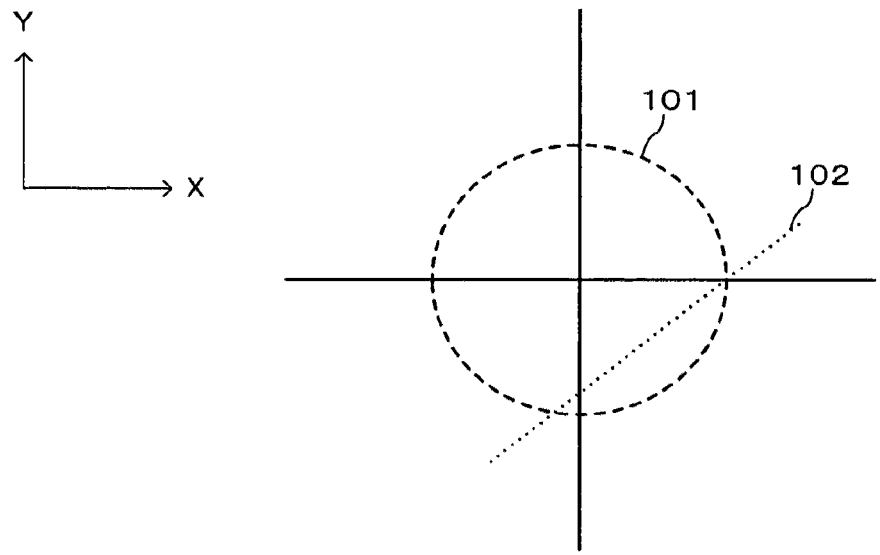
FIG. 11 is a view for explaining the principle for the swing operation detection processing according to certain example embodiments.
Figure 12:
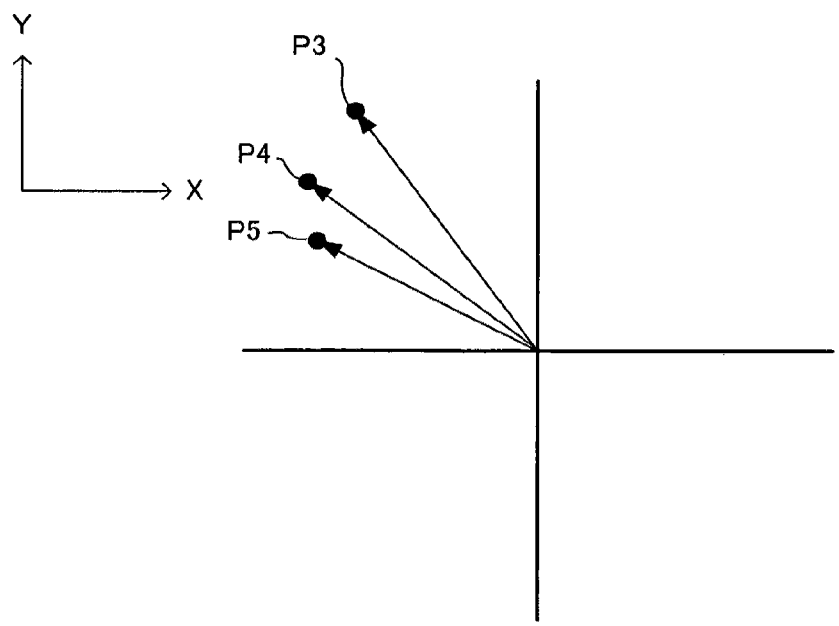
FIG. 12 is a view for explaining the principle for the swing operation detection processing according to certain example embodiments.

In the present embodiment, three threshold values are set in such a graph as described bellow, and processing is executed for recognizing an operation of one swing. As a first threshold value, a threshold value corresponding to a circle 101 as shown in FIG. 10 is set. This threshold value is used as a trigger for reproducing a music piece. Hereinafter, this threshold value is referred to as a trigger threshold value. The trigger threshold value is set every time processing of detecting one swing motion is executed (processing at a step S21). In the present embodiment, at a time when it is detected that acceleration exceeds the trigger threshold value (the circle 101), it is considered that a swing motion is performed, and processing of reproducing one bar of the music piece is executed. In FIG. 10, the origin is set as a base point (0 frame), and it is detected at a second frame (a point P2) that the acceleration exceeds the trigger threshold value. Thus, in a processing loop for the second frame, the processing of reproducing one bar of the music piece is executed.

Figure 13:
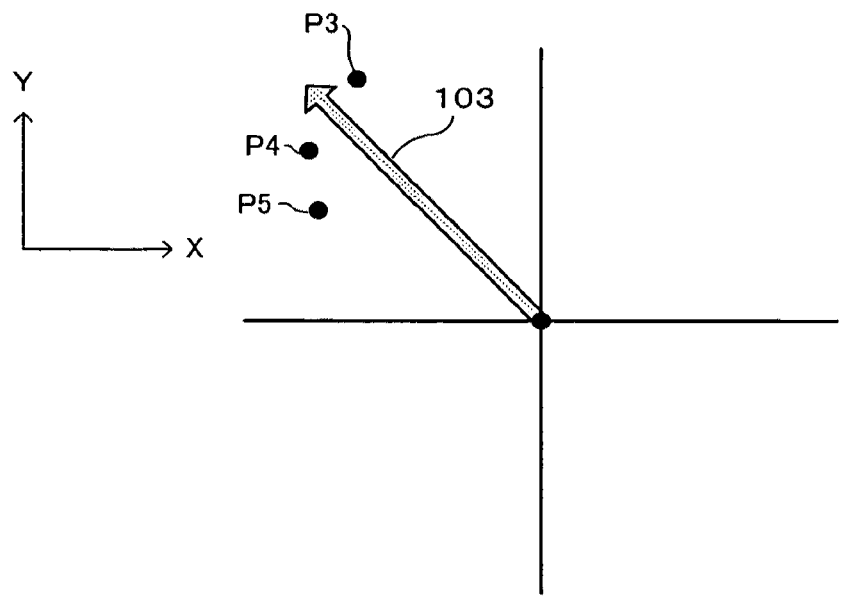
FIG. 13 is a view for explaining the principle for the swing operation detection processing according to certain example embodiments.
Figure 14:
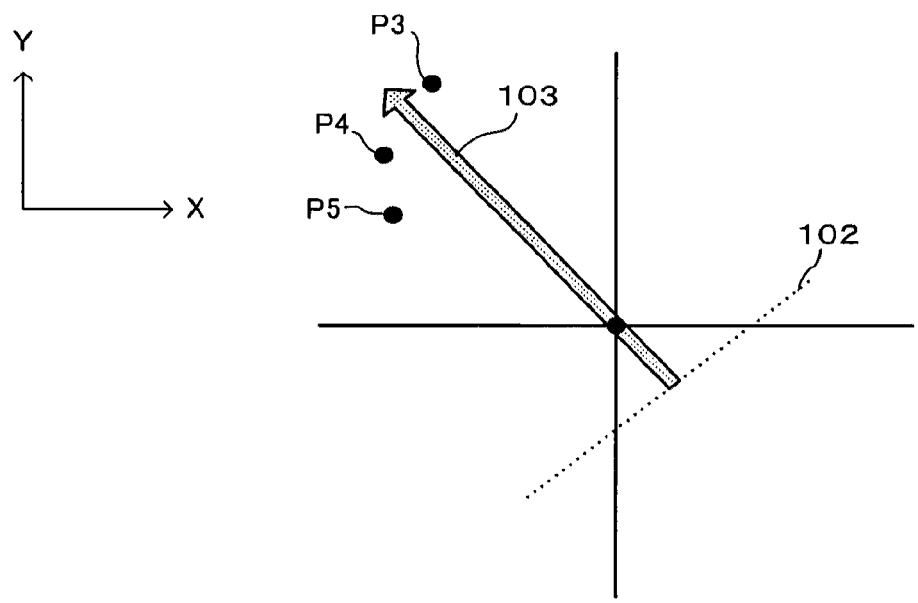
FIG. 14 is a view for explaining the principle for the swing operation detection processing according to certain example embodiments.
Figure 15:
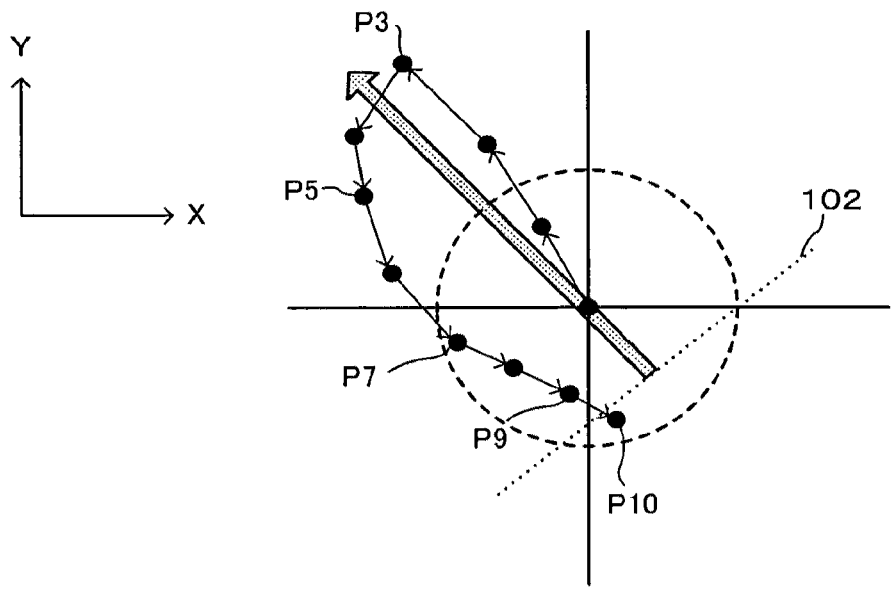
FIG. 15 is a view for explaining the principle for the swing operation detection processing according to certain example embodiments.

The following will describe a second threshold value. The second threshold value corresponds to a straight line 102 in FIG. 11. The straight line 102 has the following characteristic. A vector is calculated for each frame based on acceleration detected at each of three frames after the acceleration exceeds the trigger threshold value (FIG. 12), and these vectors are combined to calculate a swinging direction (an arrow 103 in FIG. 13). Then, as shown in FIG. 14, a straight line which is located in a position distant from the base point by a predetermined distance in a direction opposite to the swinging direction and perpendicular to the swinging direction becomes the straight line 102. The line corresponding to the straight line 102 corresponds to the second threshold value. Hereinafter, this threshold value is referred to as a waiting threshold value. In the present embodiment, after it is detected that the acceleration exceeds the trigger threshold value, until it is detected that the acceleration has shifted across the waiting threshold value (i.e. a line indicating the shift of the acceleration intersects with the straight line 102) as shown in FIG. 15, processing is executed so as not to make a determination of detection of a swinging direction (a determination as to whether or not the acceleration exceeds the trigger threshold value).

Figure 16:
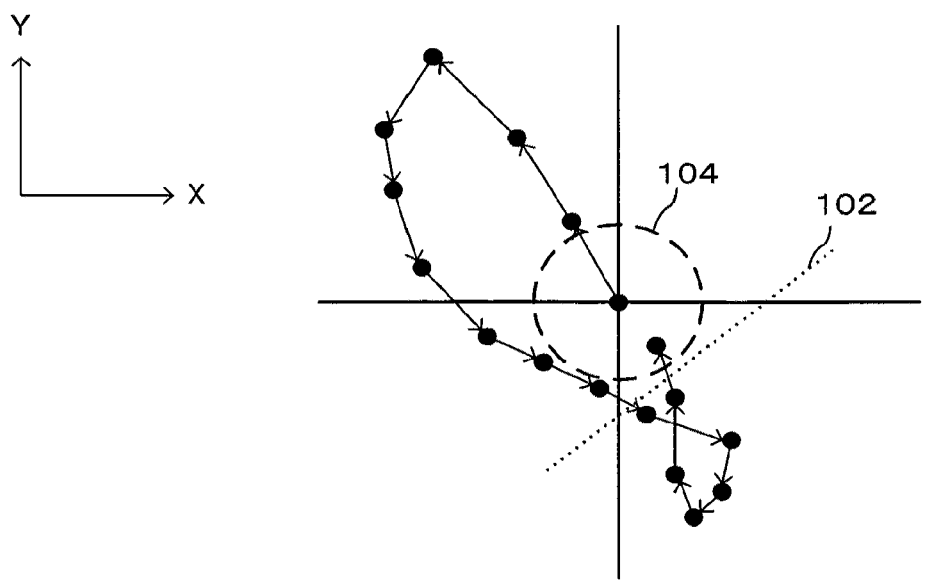
FIG. 16 is a view for explaining the principle for the swing operation detection processing according to certain example embodiments.

The following will describe a third threshold value. At a time when it is detected that the acceleration has shifted across the waiting threshold value as shown in FIG. 15, it may be determined that one swing motion is terminated but the third threshold value is further used for performing more accurate detection in the present embodiment. The third threshold value corresponds to a circle 104 as shown in FIG. 16. The circle 104 is slightly smaller than the circle 101 corresponding to the trigger threshold value. The third threshold value is used for determining whether or not the acceleration has shifted to the vicinity of the base point after the acceleration has shifted across the waiting threshold value. This is because when the acceleration has shifted to the vicinity of the base point, change of the acceleration is considered stable, and the third threshold value is useful as a breakpoint for one swing motion. Hereinafter, the third threshold value is referred to as a stability threshold value. When acceleration smaller than the stability threshold value (close to the origin) is detected, it is determined that one swing motion is terminated. More specifically, when it is determined that one swing motion is terminated, for detecting a next swing motion, processing of setting the trigger threshold value as described above is executed again, and the above processing is repeated. It is noted that concerning setting of the trigger threshold value, in the present embodiment, processing of changing the trigger threshold value (a size of the circle 101) in accordance with strength of a swing motion which is detected last is executed. This can prevent occurrence of consecutive triggers which the player does not intend.

As described above, in the present embodiment, occurrence of a swing motion is detected using the trigger threshold value. Then, until it is detected that the acceleration shifts across the waiting threshold value and it is detected that the acceleration has shifted to the vicinity of the origin (i.e. the acceleration becomes smaller than the stability threshold value), detection of a swing motion is not performed. This can prevent one swing motion performed by the player from being detected as two swing motions. In other words, the shift of the acceleration corresponding to the reverse acceleration can be prevented from being detected as occurrence of a swing motion. As a result, even when swing motions are performed consecutively, each swing motion is accurately detected, and can be reflected in the game processing.

Figure 17:
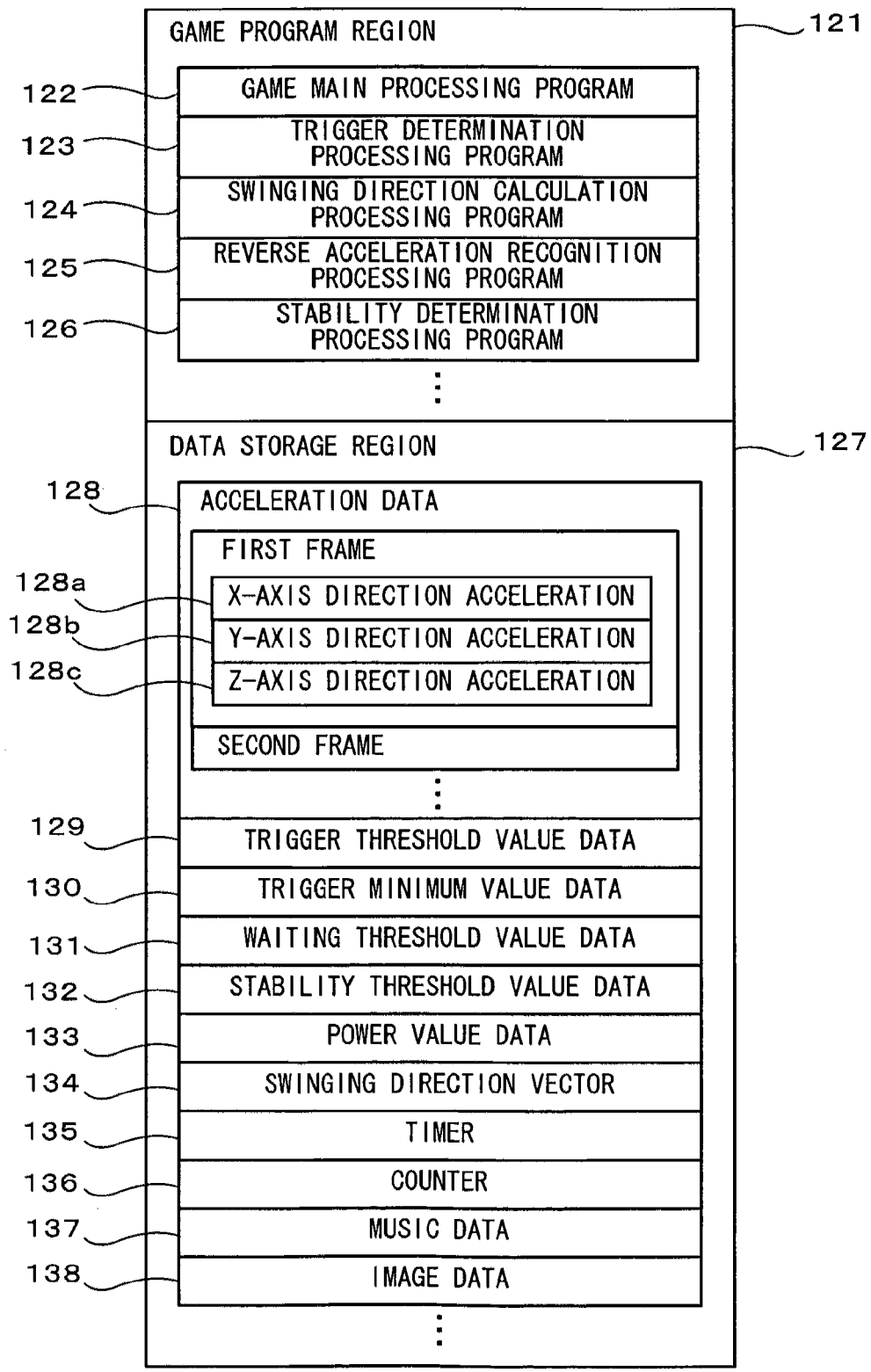
FIG. 17 illustrates a memory map of an external main memory 12 of the game apparatus 3.

The following will describe in detail the game processing executed by the game apparatus 3. First, data which are stored in the external main memory 12 when the game processing is executed will be described. FIG. 17 illustrates a memory map of the external main memory 12 of the game apparatus 3. As shown in FIG. 17, the external main memory 12 includes a game program region 121 and a data storage region 127. Data in the game program region 121 and the data storage region 127 are stored in the optical disc 4, and transferred to the external main memory 12 to be stored therein when the game program is executed.

In the game program region 121 is stored a game program, which is to be executed by the CPU 10 and includes a game main processing program 122, a trigger determination processing program 123, a swinging direction calculation processing program 124, a reverse acceleration recognition processing program 125, a stability determination processing program 126, and the like.

The game main processing program 122 is a program corresponding to later-described processing of a flow chart in FIG. 18. The trigger determination processing program 123 is a program for causing the CPU 10 to execute processing of determining whether or not acceleration exceeds the trigger threshold value as shown in FIG. 10, and the like. The swinging direction calculation processing program 124 is a program for causing the CPU 10 to execute processing of calculating the arrow 103 in FIG. 13. The reverse acceleration recognition processing program 125 is a program for causing the CPU 10 to execute processing of detecting that acceleration has shifted across the waiting threshold value (the straight line 102) in FIG. 14. The stability determination processing program 126 is a program for causing the CPU 10 to execute processing of detecting whether or not the acceleration has returned to the vicinity of the origin.

In the data storage region 127 are stored acceleration data 128, trigger threshold value data 129, trigger minimum value data 130, waiting threshold value data 131, stability threshold value data 132, power value data 133, a swinging direction vector 134, a timer 135, a counter 136, music data 137, image data 138, and the like. It is noted that in addition to data included in the information shown in FIG. 17, the main memory 33 stores data, such as data concerning various objects and the like appearing in the game (position data), data concerning a virtual game space (geographic data), and the like, which are required for executing the game processing.

The acceleration data 128 is acceleration data included in the series of operation information which are transmitted as the transmission data from the controller 7. The obtained acceleration data for predetermined frames (for 30 frames with respect to one frame (1/60 sec.) which is a game processing cycle) is stored. The acceleration data 128 includes X-axis direction acceleration 128a, Y-axis direction acceleration 128b, and Z-axis direction acceleration 128c which are detected by the acceleration sensor 701 as three-axis components, namely, X-axis, Y-axis, and Z-axis components, respectively. It is noted that in the present embodiment, a value of acceleration ranges from −2G to +2G.

The trigger threshold value data 129 is data (corresponding to the circle 101 in FIG. 10) used as a criterion for determining whether or not a swing motion occurs. The trigger minimum value data 130 is data indicating a minimum value for the trigger threshold value. In other words, in the present embodiment, a value of the trigger threshold value data 129 does not become smaller than that of the trigger minimum value data 130. In the present embodiment, a predetermined value is not set in advance in the trigger minimum value data 130.

The waiting threshold value data 131 is data corresponding to the straight line 102 described above with reference to FIGS. 11 and 14. It is noted that in the present embodiment, a value of −1 is set in advance in the waiting threshold value data 131. Such a value is set for executing processing of determining whether or not acceleration exceeds the waiting threshold value in the present embodiment. This processing will be described later.

The stability threshold value data 132 is data corresponding to the circle 104 described above with reference to FIG. 16. In other words, the stability threshold value data 132 is used for determining whether or not the acceleration has shifted to the vicinity of the origin. In the present embodiment, a predetermined value smaller than the value of the trigger minimum value data 130 is set in advance in the stability threshold value data 132. It is noted that since the stability threshold value is used for determining that the acceleration is in the vicinity of the origin, the trigger minimum value data 130 may be used instead of the stability threshold value data 132 depending on the value of the trigger minimum value data 130. In other words, when the value of the trigger minimum value data 130 is close to the origin, it may be used as the stability threshold value data 132.

The power value data 133 is data indicating a magnitude of maximum acceleration of a swing motion performed last, and used for setting the value of the trigger threshold value data 129. In other words, the power value data 133 is used for changing the size of the circle 101 in FIG. 10 in accordance with strength of the swing motion performed last.

The swinging direction vector 134 is a vector data indicating a swinging direction (the arrow 103 in FIG. 13) which is used for setting the waiting threshold value as described above with reference to FIGS. 11 and 14, and the like.

The timer 135 and the counter 136 are variables used in the later-described game processing in the present embodiment.

The music data 137 is data of music pieces, each of which is to be reproduced in accordance with a swing motion by the player. The music data 137 has a data structure in which data is divided to be capable of being reproduced for each bar.

The image data 138 is data of various images (musical performer objects and the like) which are to be displayed in the game processing.

Figure 18:
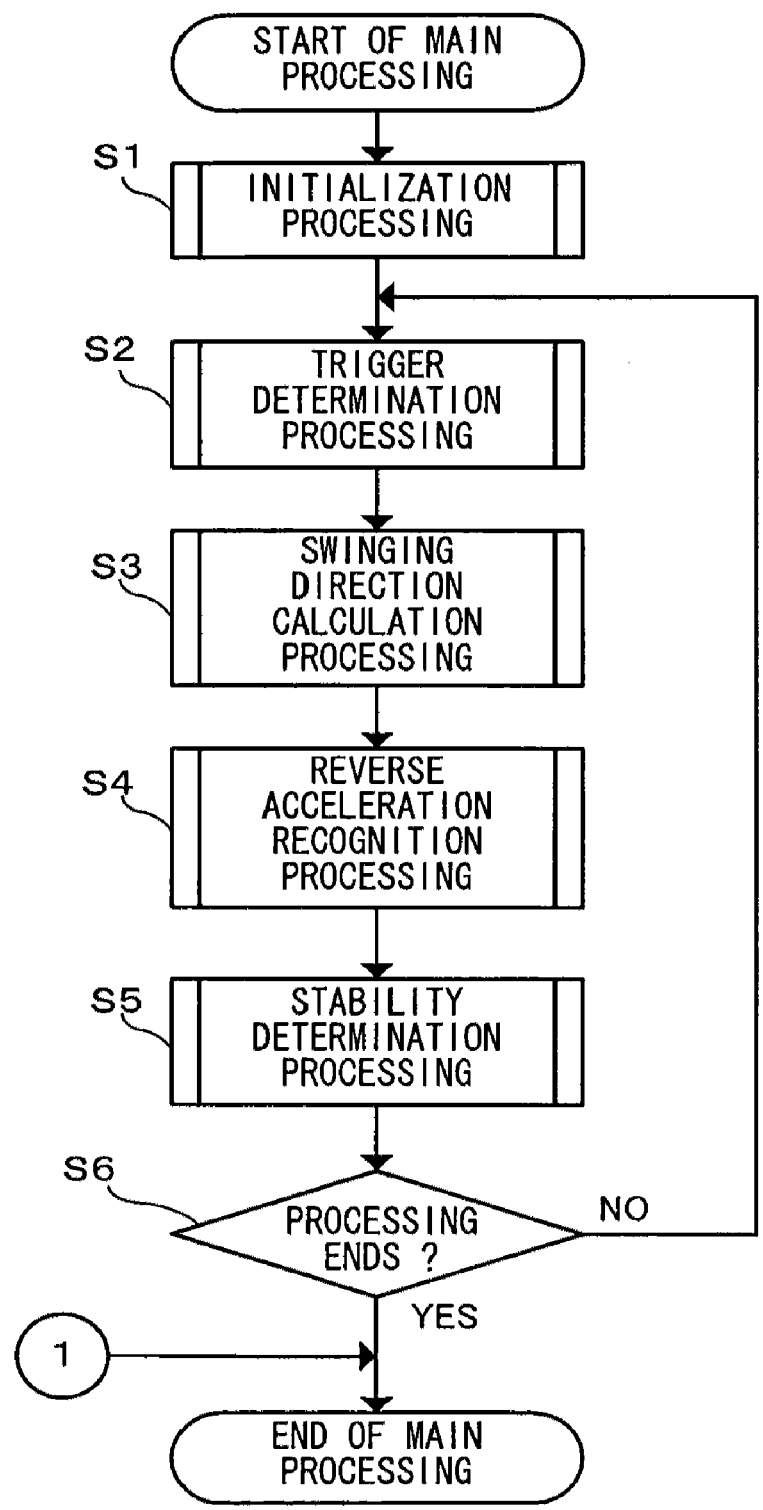
FIG. 18 is a flow chart showing game processing according to certain example embodiments.

The following will describe musical performance game processing executed by the game apparatus 3 with reference to FIGS. 18 to 26. When power is applied to the game apparatus 3, the CPU 10 of the game apparatus 3 executes the boot program stored in the ROM/RTC 13 to initialize each unit such as the main memory 33 and the like. Then, the game program stored in the optical disc 4 is read by the external main memory 12, and the CPU 10 starts to execute the game program. The flow chart shown in FIG. 18 shows game processing which is executed after the completion of the above processing. A processing loop of steps S2 to S6 shown in FIG. 18 is repeated for every one frame (except for the case where steps S3, S4, and S5 are executed).

Figure 19:
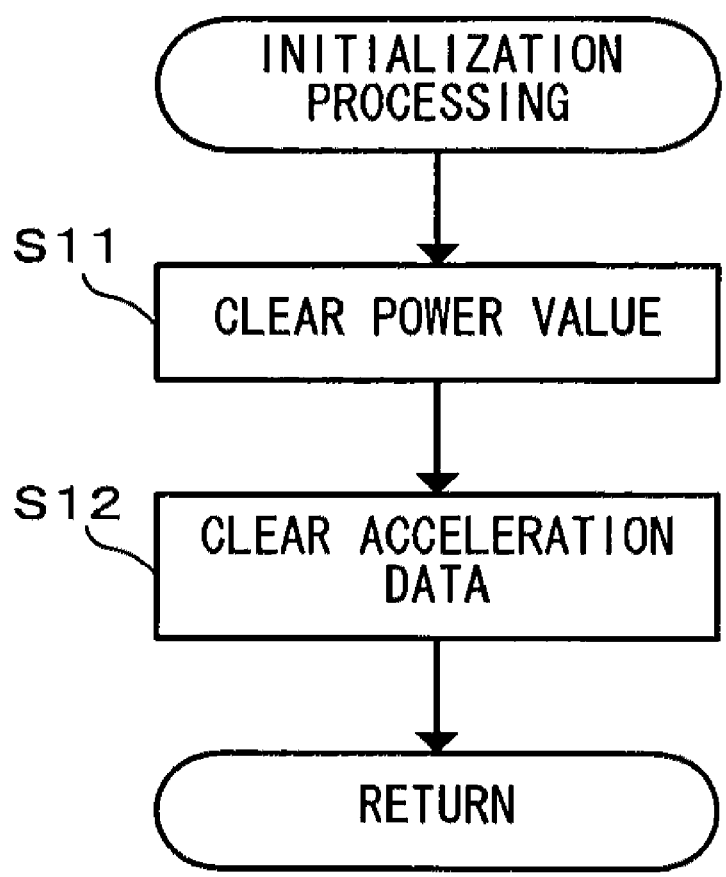
FIG. 19 is a flow chart showing in detail initialization processing shown at a step S1 in FIG. 18.

As shown in FIG. 18, the CPU 10 executes initialization processing (a step S1). FIG. 19 is a flow chart showing in detail the initialization processing shown at the step S1. As shown in FIG. 19, the CPU 10 clears (sets 0 in) the power value data 133 (a step S11). Next, the CPU 10 clears the acceleration data 128 (a step S12). Then, the initialization processing is terminated.

Figure 20:
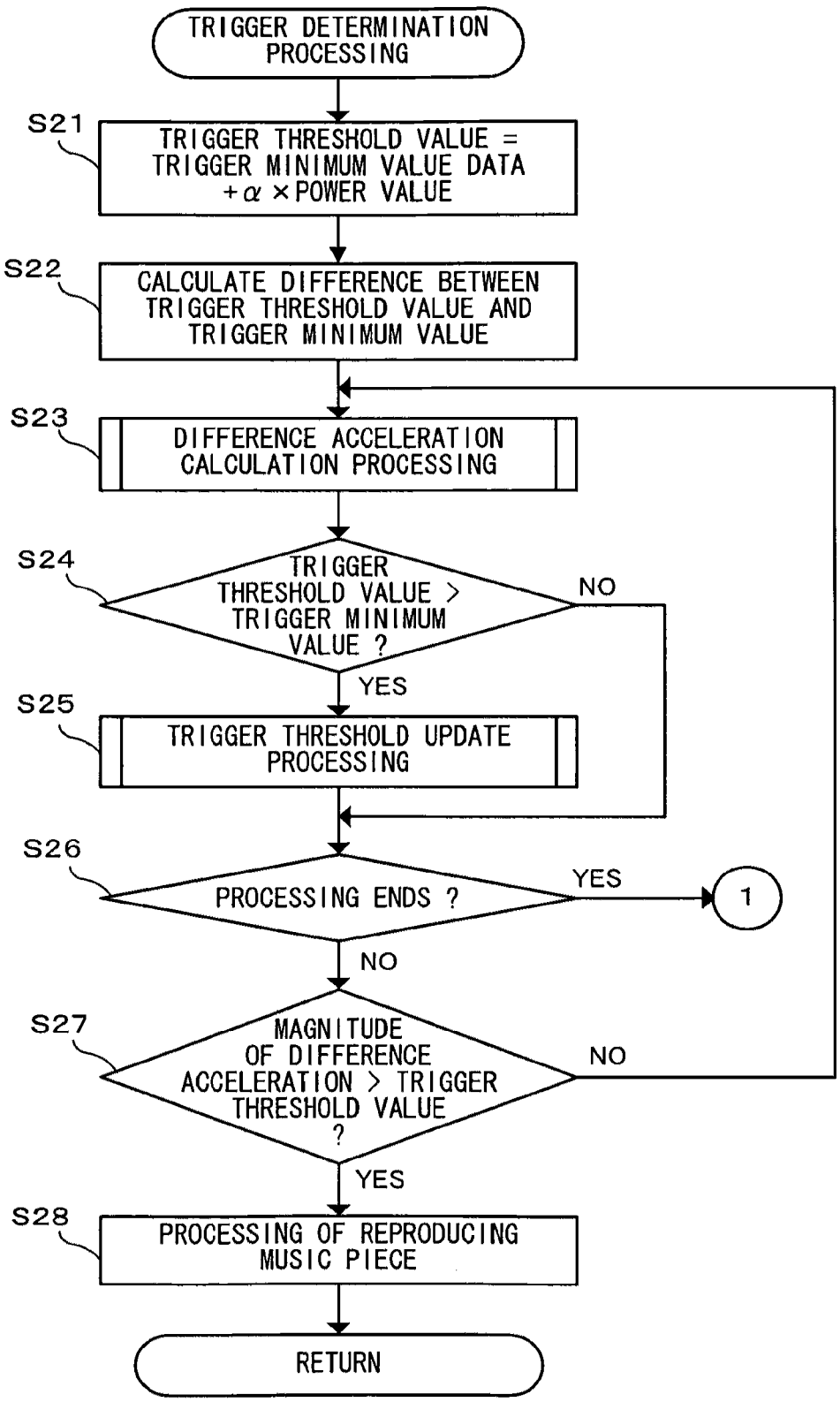
FIG. 20 is a flow chart showing in detail trigger determination processing shown at a step S2 in FIG. 18.

Referring back to FIG. 18, next, the CPU 10 executes trigger determination processing (the step S2). FIG. 20 is a flow chart showing in detail the trigger determination processing shown at the step S2. As shown in FIG. 20, the CPU 10 calculates the value of the trigger threshold value data 129 by using the following equation (the step S21):

trigger threshold value data 129=trigger minimum value data 130+α×power value data 133.

Here, a predetermined value is set in advance as the coefficient α. Further, as described above, a predetermined value is set in advance in the trigger minimum value data 130.

Next, the CPU 10 calculates a difference between the value of the trigger threshold value data 129 and the value of the trigger minimum value data 130 (a step S22). The calculated difference is used in later-described trigger threshold value update processing at a step S25.

Figure 21:
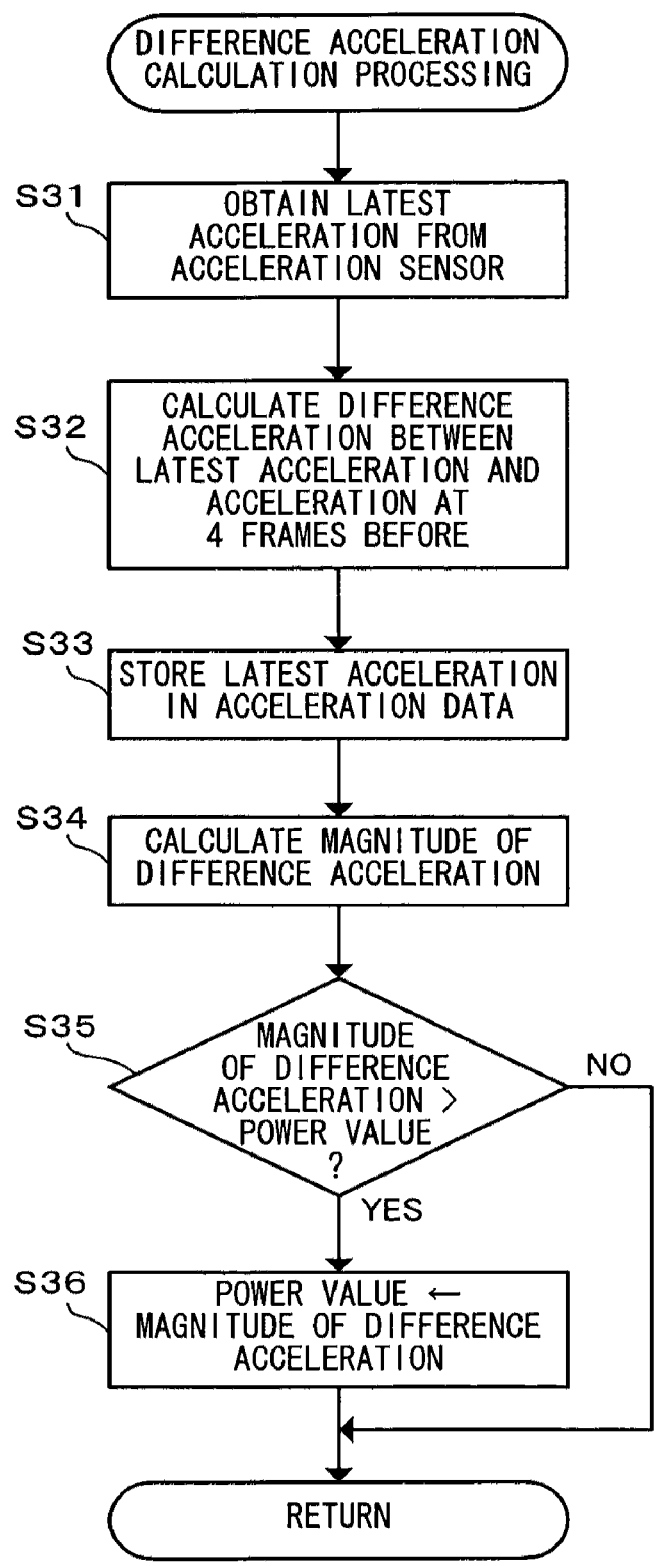
FIG. 21 is a flow chart showing in detail difference acceleration calculation processing shown at a step S23 in FIG. 20.

Next, the CPU 10 executes difference acceleration calculation processing (a step S23). In this processing, processing of eliminating a gravitational acceleration component from the acceleration obtained from the controller 7, and the like are executed. FIG. 21 is a flow chart showing in detail the difference acceleration calculation processing shown at the step S23. As shown in FIG. 21, the latest X-axis and Y-axis acceleration are obtained from the acceleration sensor 701 (a step S31).

Next, the CPU 10 obtains from the acceleration data 128 X-axis and Y-axis acceleration at four frames before. The CPU 10 calculates a difference between the acceleration at four frames before and the latest acceleration for each of X-axis and Y-axis (a step S32), thereby calculating acceleration in which the gravitational acceleration component is eliminated (to be precise, a change amount of acceleration). Hereinafter, the calculated acceleration are referred to X-axis difference acceleration and Y-axis difference acceleration.

It is noted that the difference between the acceleration at four frames before and the latest acceleration is calculated at the step S32 in order to reduce an effect of noise (e.g. small acceleration unexpectedly generated by shake of a hand, and the like). In other words, only for eliminating the gravitational acceleration component, it is sufficient to calculate a difference between acceleration at one frame before and the latest acceleration. However, when the difference between acceleration at one frame before and the latest acceleration is calculated, it is susceptible to the effect of the above noise, so that difference acceleration in which slight shake of a hand and the like is reflected may be calculated. Thus, in the present embodiment, in order to reduce the effect of such noise for calculating more accurate difference acceleration, a difference between the latest acceleration and the acceleration not at one frame before but at four frames before is calculated. Further, a value of the acceleration at four frames before is not an absolute value. The value is obtained as a most appropriate value by performing a simulation and the like using a real machine as appropriate. For that reason, for example, a most appropriate value may be adjusted as appropriate to be, for example, a value at three frames before or at five frames before depending on a characteristic of the acceleration sensor, and the like.

Next, the latest acceleration is stored in the acceleration data 128 (a step S33). As described above, acceleration data for the predetermined frames (30 frames in the present embodiment) are stored in the acceleration data 128. However, when data for the predetermined frames have already been stored, namely, when there is no space in a storage region of the acceleration data 128, the oldest data is deleted in the acceleration data 128, and data of the latest acceleration is stored therein.

Next, the CPU 10 calculates a magnitude of the difference acceleration (a step S34). In other words, the CPU 10 calculates a magnitude (a length) of a vector corresponding to the difference acceleration. More specifically, the CPU 10 calculates the magnitude of the difference acceleration by using the following equation.

magnitude of difference acceleration=√(X-axis difference acceleration)$^2$+(Y-axis difference acceleration)$^2$        [Mathematical Expression 1]

Next, the CPU 10 determines whether or not the magnitude of the difference acceleration is larger than the power value data 133 (a step S35). When the magnitude of the difference acceleration is larger than the power value data 133 (YES at the step S35), the power value data 133 is updated with the magnitude of the difference acceleration (a step S36), and the processing is terminated. On the other hand, when the magnitude of the difference acceleration is not larger than the power value data 133 (NO at the step S35), the processing at the step S36 is not executed, and the processing is terminated. This is the end of the description of the difference acceleration calculation processing.

Referring back to FIG. 20, when the difference acceleration calculation processing is terminated, the CPU 10 determines whether or not the trigger threshold value data 129 is larger than the trigger minimum value data 130 (a step S24). As a result of the determination, when the trigger threshold value data 129 is larger than the trigger minimum value data 130 (YES at the step S24), the CPU 10 executes the trigger threshold value update processing (the step S25). In this processing, processing of returning the trigger threshold value data 129 to a value indicated by the trigger minimum value data 130 for a predetermined time period is executed. In other words, processing of gradually reducing the size of the circle 101 as shown in FIG. 10 to a size of a circle indicated by the trigger minimum value data 130 for the predetermined time period is executed. On the other hand, when the trigger threshold value data 129 is not larger than the trigger minimum value data 130 (NO at the step S24), the CPU 10 advances the processing to a later-described step S26. In other words, when the size of the circle 101 is reduced to the size indicated by the trigger minimum value data 130, it is not reduced further.

Figure 22:
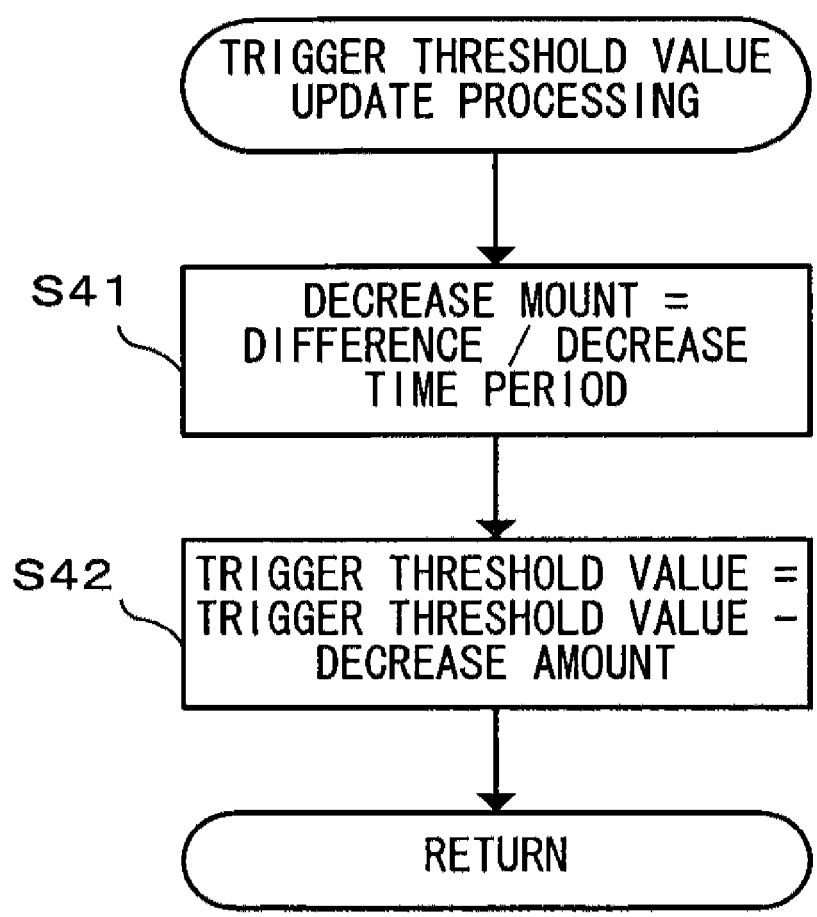
FIG. 22 is a flow chart showing in detail trigger threshold value update processing shown at a step S25 in FIG. 20.

FIG. 22 is a flow chart showing in detail the trigger threshold value update processing shown at the step S25. As shown in FIG. 22, the CPU 10 calculates a decrease amount by using the following equation based on the difference between the value of the trigger threshold value data 129 and the value of the trigger minimum value data 130, which is calculated at the step S22 (a step S41).

decrease amount=difference/decrease time period

Here, for the decrease time period, a predetermined value is set in advance as a fixed value.

Next, the CPU 10 calculates the value of the trigger threshold value data 129 by using the following equation (a step S42). In other words, processing of reducing the size of the circle 101 in FIG. 11 and the like is executed.

trigger threshold value=trigger threshold value−decrease amount

As described above, the trigger threshold value is gradually decreased, thereby reducing an effect caused by a different manner of player's swing. Then, the trigger threshold value update processing is terminated.

Referring back to FIG. 20, subsequently to the processing at the step S25, the CPU 10 determines whether or not a condition for terminating the game processing is satisfied (the step S26). As a result of the determination, when the condition for terminating the game processing is satisfied (YES at the step S26), the game processing according to the present embodiment is terminated. On the other hand, when the condition for terminating the game processing is not satisfied (NO at the step S26), the CPU 10 determines whether or not the magnitude of the difference acceleration exceeds the value of the trigger threshold value data 129, namely, whether or not a swing motion occurs (a step S27). As a result, when the magnitude of the difference acceleration exceeds the value of the trigger threshold value data 129 (YES at the step S27), the CPU 10 executes processing of reproducing a music piece only for one bar thereof (which corresponds to one swing) (a step S28). When the magnitude of the difference acceleration does not exceed the value of the trigger threshold value data 129 (NO at the step S27), the CPU 10 returns to the step S23, and repeats the processing. This is the end of the description of the trigger determination processing.

Referring back to FIG. 18, next, the CPU 10 executes swinging direction calculation processing (the step S3). In other words, processing of calculating the arrow 103 shown in FIG. 13 is executed. In this processing, processing of setting as a swinging direction vector a vector obtained by combining vectors, directed from the origin, of difference acceleration which are respectively detected in processing loops for three frames after it is detected that the difference acceleration exceeds the trigger threshold value is executed.

Figure 23:
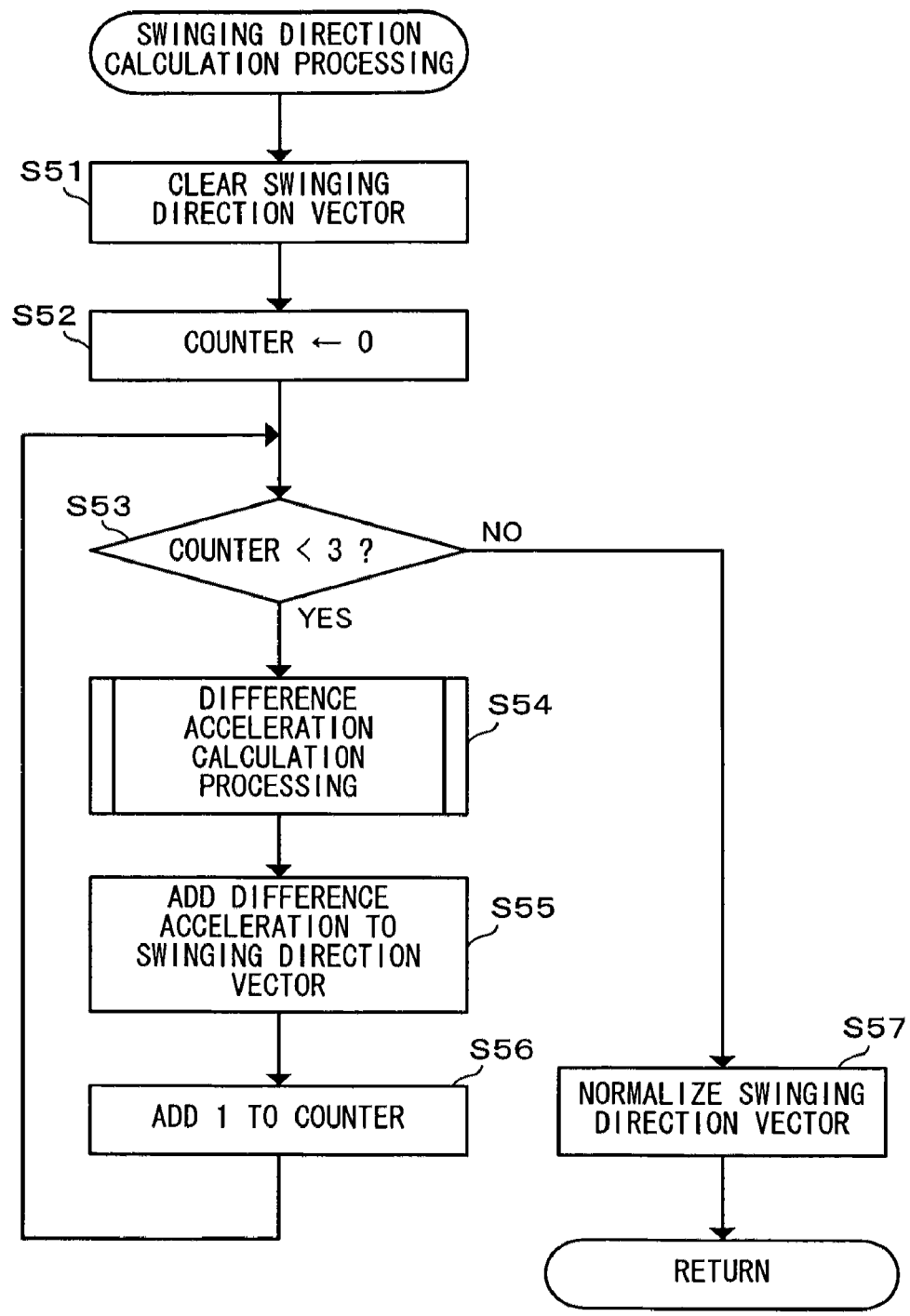
FIG. 23 is a flow chart showing in detail swinging direction calculation processing shown at a step S3 in FIG. 18.

FIG. 23 is a flow chart showing in detail the swinging direction calculation processing shown at the step S3. As shown in FIG. 23, the CPU 10 clears the swinging direction vector 134 (a step S51). Then, the CPU 10 sets "0" at the counter 136 (a step S52).

Next, the CPU 10 determines whether or not the counter 136 is smaller than "3" (a step S53). As a result of the determination, when the counter 136 is smaller than "3" (YES at the step S53), the CPU 10 executes difference acceleration calculation processing as described above (a step S54). This processing is the same as the above processing at the step S23, and hence the description thereof will be omitted.

Next, the CPU 10 adds the acceleration calculated at the step S54 to the swinging direction vector 134 (a step S55). Subsequently, the CPU 10 adds "1" to the counter 136 (a step S56), and returns to the processing at the step S53.

On the other hand, as the result of the determination at the step S53, when the counter 136 is not smaller than "3" (NO at the step S53), the CPU 10 normalizes the swinging direction vector 134 (a step S57). In other words, the CPU 10 sets a length of a vector indicated by the swinging direction vector 134 obtained as a result of the processing at the step S55 to be "1". It is noted that only for obtaining a swinging direction, such normalization is not needed but for convenience of later-described processing and other game processing, the normalization is performed in the present embodiment. Then, the swinging direction calculation processing is terminated.

Figure 24:
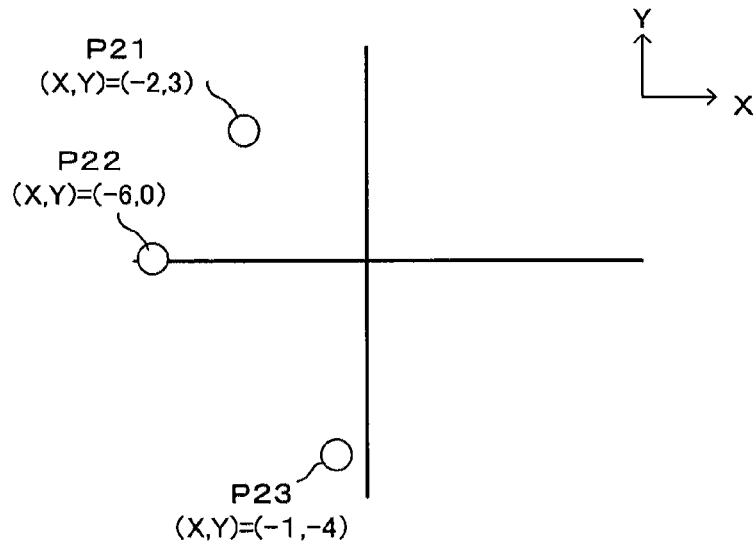
FIG. 24 is a view for explaining an outline of reverse acceleration recognition processing shown at a step S4 in FIG. 18.
Figure 25:
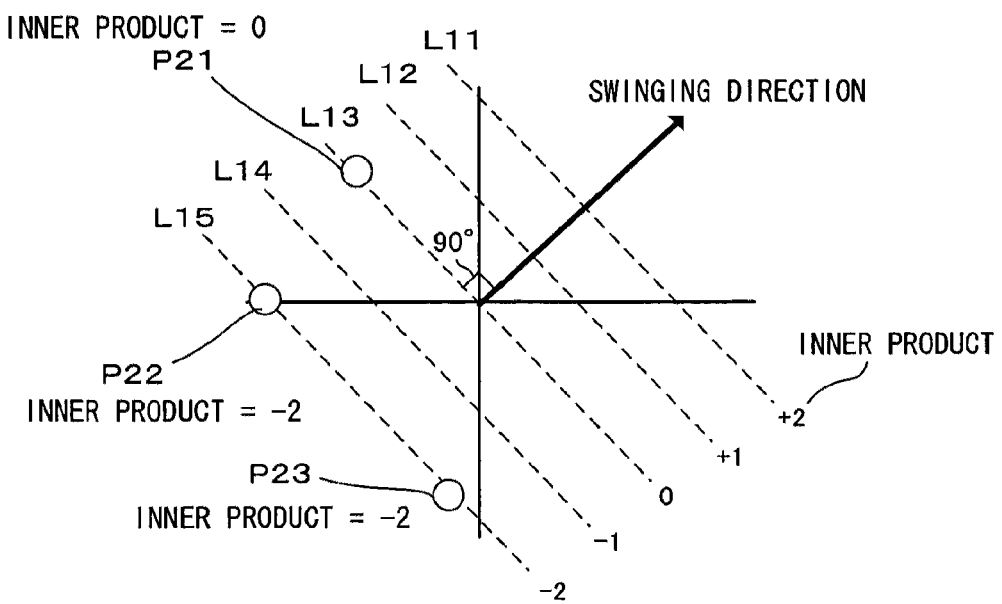
FIG. 25 is a view for explaining the outline of the reverse acceleration recognition processing shown at the step S4 in FIG. 18.

Referring back to FIG. 18, subsequently to the processing at the step S3, the CPU 10 executes reverse acceleration recognition processing (the step S4). In this processing, a determination is made as to whether or not the acceleration has shifted across the straight line 102 (the waiting threshold value) shown in FIGS. 11 and 15. First, an outline of this processing will be described with reference to FIGS. 24 to 27. In the present embodiment, the determination is made by using an inner product. For example, in an X-Y coordinate system as shown in FIG. 24, there are three points P21 to P23 (which correspond to difference acceleration). When the above swinging direction vector is set in an obliquely upward right direction at an angle of 45 degrees (a length thereof is "1"), an inner product between the swinging direction and each of the points P21 to P23 is as shown in FIG. 25 and as follows.

inner product between swinging direction and point $P21$="0"

inner product between swinging direction and point $P22$="-2"

inner product between swinging direction and point $P23$="-2"

Figure 26:
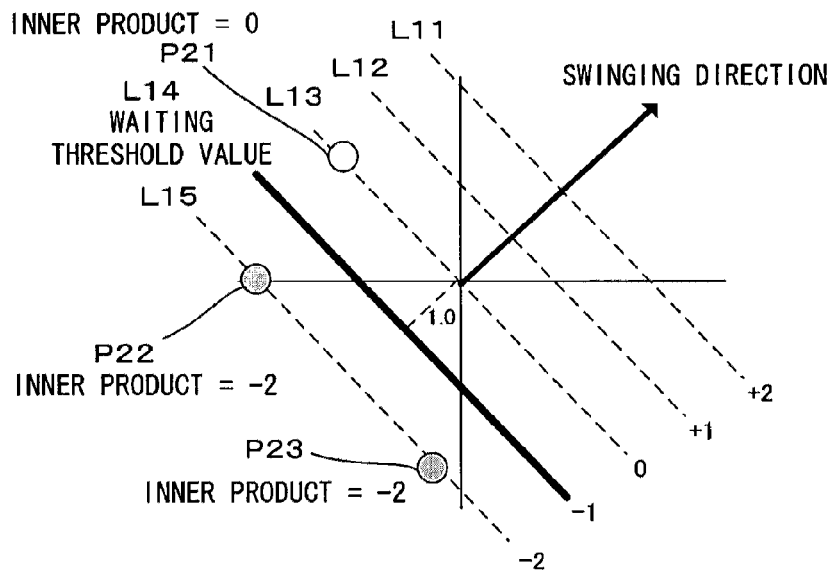
FIG. 26 is a view for explaining the outline of the reverse acceleration recognition processing shown at the step S4 in FIG. 18.
Figure 27:
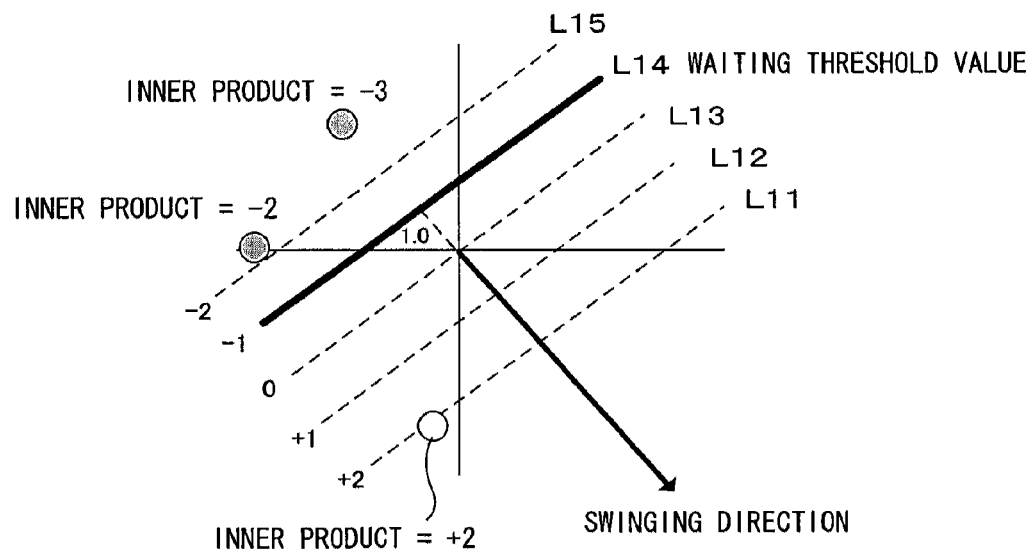
FIG. 27 is a view for explaining the outline of the reverse acceleration recognition processing shown at the step S4 in FIG. 18.

Here, these values of the inner products each have an aspect that the value indicates a distance along the swing direction (dotted lines L11 to L15 in FIG. 25). Thus, when the waiting threshold value is set to be "4", the waiting threshold value corresponds to the dotted line L14 which is distant from an origin by 1.0 in a direction opposite to the swinging direction as shown in FIG. 26 (which is a line in which an inner product becomes "4", corresponds to the straight line 102 in FIG. 14 and the like, and is perpendicular to the swinging direction). Thus, by comparing the above values of the inner products with the waiting threshold value, "4", a determination can be made as to whether a point indicating difference acceleration is located on an inner side (a side close to the origin, the point P21 in FIG. 26) or an outer side (a side distant from the origin, the points P22 and P23 in FIG. 26) of the dotted line 14. Consequently, in the present embodiment, by determining whether or not the inner product has shifted from the outer side of the waiting threshold value, "4", to the inner side thereof, the determination is made as to whether or not the inner product has shifted across the dotted line L14 (corresponding to the waiting threshold value). It is noted that a different swinging direction causes a different position and a different inclination of a dotted line corresponding to the waiting threshold value. As an example, FIG. 27 shows inner products and a waiting threshold value in a case where the swinging direction is the obliquely downward right direction at an angle of 45 degrees.

Figure 28:
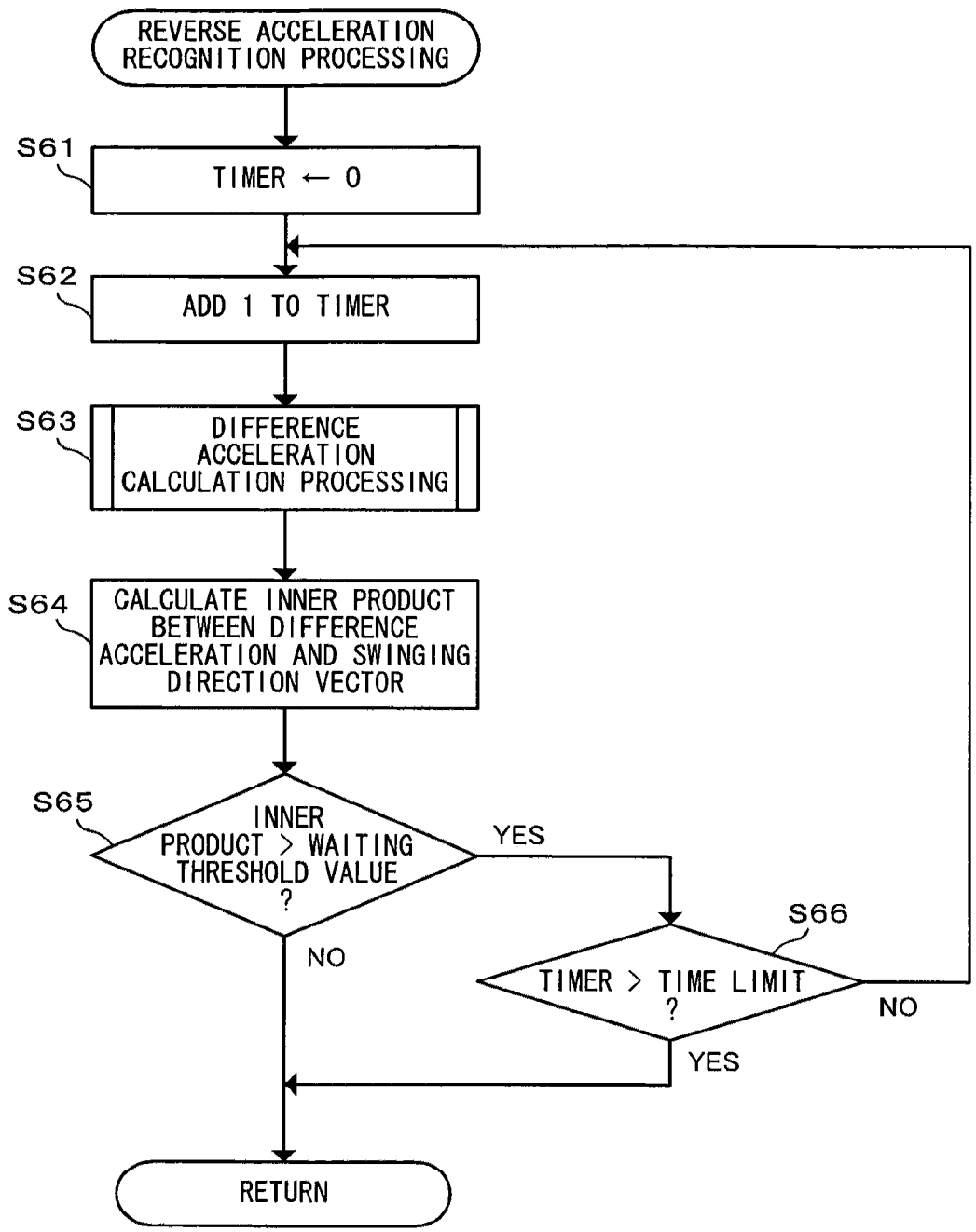
FIG. 28 is a flow chart showing in detail the reverse acceleration recognition processing shown at the step S4 in FIG. 18.

FIG. 28 is a flow chart showing in detail the reverse acceleration recognition processing shown at the step S4. As shown in FIG. 28, the CPU 10 sets "0" at the timer 135 (a step S61). Then, the CPU 10 adds "1" to the timer 135 (a step S62).

Next, the CPU 10 executes the difference acceleration calculation processing (a step S63). This processing is the same as the above processing at the step S23, and hence the description thereof will be omitted.

Next, the CPU 10 calculates an inner product between difference acceleration calculated at the step S63 and the vector indicated by the swinging direction vector 134 (a step S64).

Next, the CPU 10 determines whether or not the calculated inner product is larger than the value of the waiting threshold value data 131 (a step S65). In the present embodiment, since the value of "-1" is set in advance as a value of the waiting threshold value data 131, for example, in FIG. 26, if the inner product is "4", it can be determined that the acceleration has not shifted across the dotted line L14. If the inner product is smaller than "4", it can be determined that the acceleration has shifted across the dotted line L14.

As a result of the determination at the step S65, when it is determined that the inner product is not larger than (i.e. equal to or smaller than) the value of the waiting threshold value data 131 (NO at the step S65), the reverse acceleration recognition processing is terminated. On the other hand, when it is determined that the inner product is larger than the value of the waiting threshold value data 131 (YES at the step S65), it is considered that the acceleration has not shifted across the dotted line 14, and thus, next, the CPU 10 determines whether or not the timer 135 is larger than a time limit (a step S66). Here, the time limit is a predetermined constant number. The determination is made for when a predetermined time period elapses, assuming that the acceleration has shifted across the dotted line L14 even if the acceleration has not actually shifted across the dotted line L14. In other words, in order to execute subsequent processing even when it is not detected for a long time that the acceleration has shifted across the dotted line L14, the time limit is set for determining whether or the acceleration has shifted across the dotted line L14. As a result of the determination, when the value of the timer 135 is within the time limit (NO at the step S66), the CPU 10 returns to the processing at the step S62. On the other hand, when the value of the timer 135 exceeds the time limit (YES at the step S66), the reverse acceleration recognition processing is terminated. This is the end of the description of the reverse acceleration recognition processing.

Referring back to FIG. 18, when the reverse acceleration recognition processing at the step S4 is terminated, next, the CPU 10 executes stability determination processing (the step S5). In this processing, as described with reference to FIG. 16, a determination is made as to whether or not the acceleration which has shifted across the waiting threshold value has returned to the vicinity of the origin.

Figure 29:
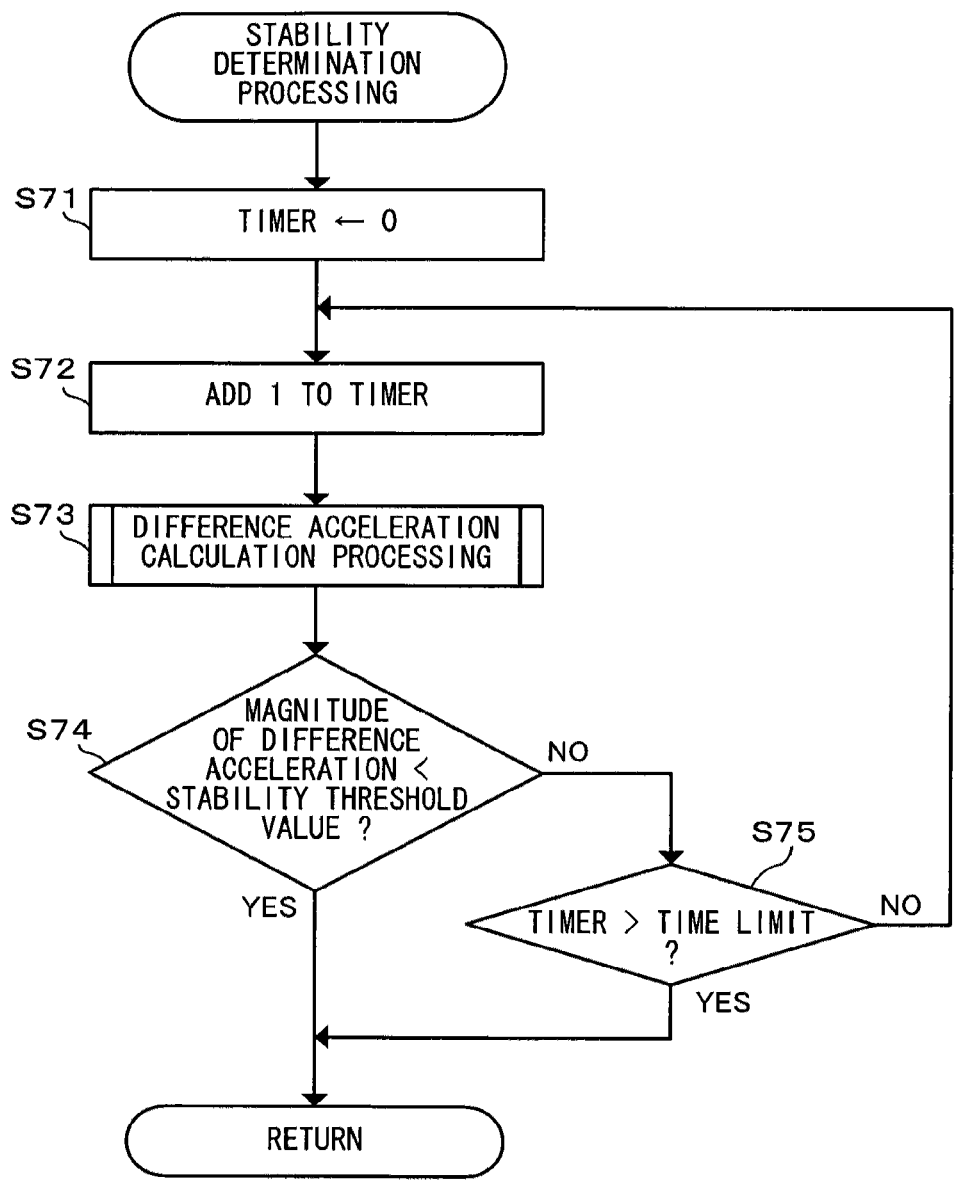
FIG. 29 is a flow chart showing in detail stability determination processing shown at a step S5 in FIG. 18.

FIG. 29 is a flow chart showing in detail the stability determination processing shown at the step S5. As shown in FIG. 29, the CPU 10 sets "0" at the timer 135 (a step S71). Then, the CPU 10 adds "1" to the timer 135 (a step S72).

Next, the CPU 10 executed difference acceleration calculation processing as described above (a step S73). This processing is the same as the processing at the step S23, and hence the description thereof will be omitted.

Next, the CPU 10 determines whether or not a magnitude of difference acceleration calculated at the step S73 is smaller than the value of the stability threshold value data 132 (a step S74). In other words, the CPU 10 determines whether or not the acceleration has shifted to the inside (the origin side) of the circle 104 as shown in FIG. 6. As a result of the determination, when the magnitude of the difference acceleration is smaller than the value of the stability threshold value data 132 (YES at the step S74), the stability determination processing is terminated.

On the other hand, when the magnitude of the difference acceleration is not smaller than the value of the stability threshold value data 132 (NO at the step S74), the CPU 10 determines whether or not the timer 135 is larger than the time limit (a step S75). In other words, for the same purpose as the above step S66, a determination is made as to whether or not the time limit has elapsed before the acceleration shifts to the stability threshold value. As a result of the determination, when the timer 135 is larger than the time limit (YES at the step S75), namely, when the time limit has elapsed before the acceleration shifts to the stability threshold value, the stability determination processing is terminated. On the other hand, when the timer 135 is not larger than the time limit, namely, when the time limit has not elapsed (NO at the step S75), the CPU 10 returns to the processing at the step S72. This is the end of the description of the stability determination processing.

Referring back to FIG. 18, when the stability determination processing at the step S5 is terminated, next, the CPU 10 determines whether or not a condition for terminating the game processing is satisfied (a step S6). When a result of the determination is YES, the CPU 10 terminates the game processing. When the result of the determination is NO, the CPU 10 returns to the step S2, and repeats the game processing. This is the end of the description of the game processing according to the present embodiment.

As described above, in the present embodiment, after occurrence of a "swing" motion is detected by excess of acceleration over the trigger threshold value, until it is detected that the acceleration has shifted across the waiting threshold value, processing is executed so as not to perform detection of a "swing" motion. This can prevent a "swing" motion from being detected by acceleration generated in a direction opposite to the swinging direction. As a result, for example, in processing for a game, and the like in which consecutive "swing" motions are performed as if a baton is swung for an orchestra, each swing motion can be detected more accurately. Further, since the waiting threshold value is set in accordance with the swinging direction, "swing" motions in various directions can be accurately detected.

Figure 30:
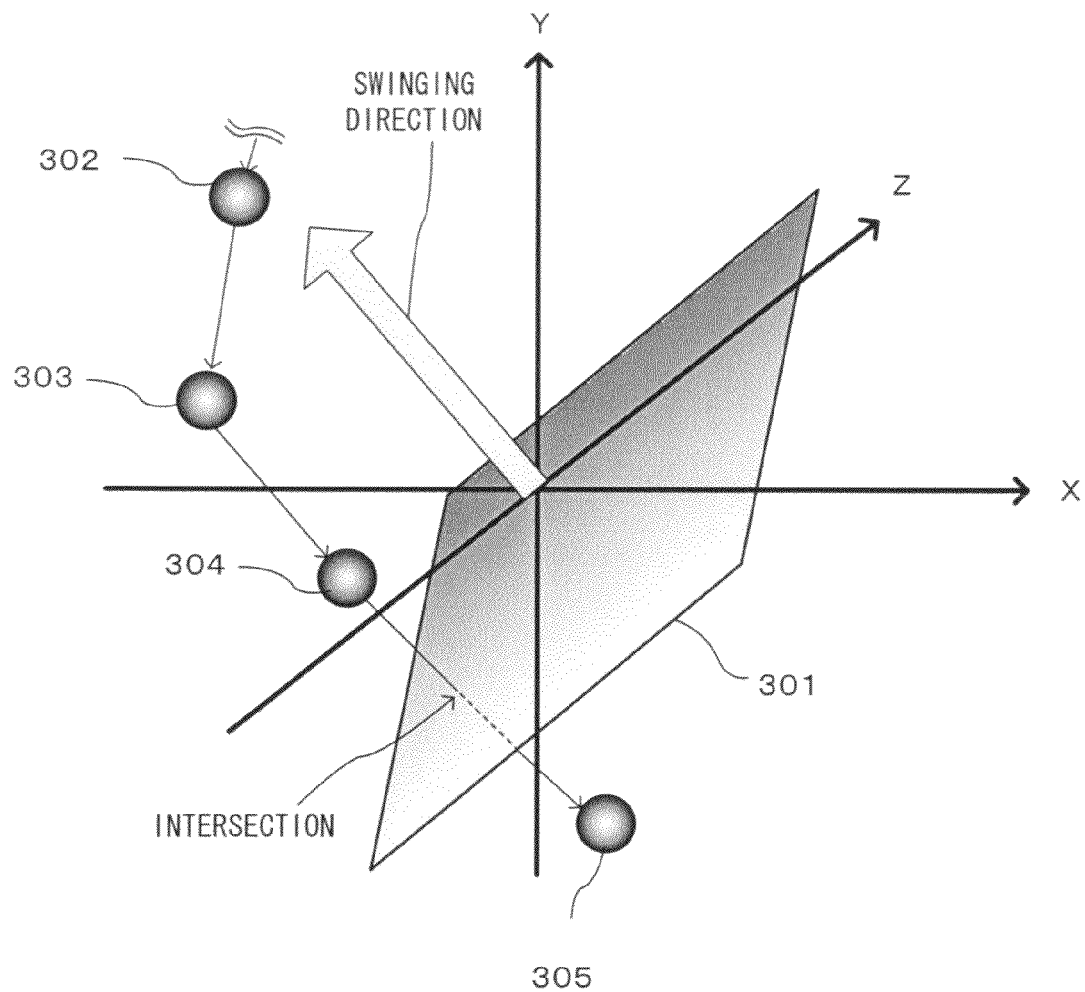
FIG. 30 is a conceptual diagram for processing in the case of an example three-axis acceleration.

In the above embodiment, in detecting that the acceleration has shifted across the waiting threshold value, a determination is made by using two-axis acceleration, namely, X-axis and Y-axis acceleration. However, the present invention is not limited thereto, and the determination may be made by using three-axis acceleration including Z-axis acceleration. FIG. 30 is a conceptual diagram for processing in the case of detecting that the acceleration has shifted across the waiting threshold value as described above by using three-axis acceleration. In the case of the processing using the three-axis acceleration, an element corresponding to the above waiting threshold value is a plane 301 in FIG. 30. The plane 301 is perpendicular to a swinging direction and located in a position distant from an origin by a predetermined distance in a direction opposite to the swinging direction. In calculating difference acceleration, three-axis acceleration including a Z-axis component is calculated, and a line connecting the difference acceleration (spheres 302 to 305 in FIG. 30) is calculated. After it is detected that the acceleration has shifted across the above trigger threshold value, if a determination is made as to whether or not the line connecting the difference acceleration intersects with the plane 301 corresponding to the above waiting threshold value, it can be detected that the acceleration has shifted across the waiting threshold value similarly as in the above embodiment.

Further, in the above embodiment, the predetermined fixed values are set as the values of the waiting threshold value data 131 and the stability threshold value data 132, respectively (e.g. the value of the waiting threshold value data 131 is "4"), and the determinations are made. However, the present invention is not limited thereto, and these values may be variable values. For example, these values may be changed as appropriate in accordance with the value of the power value data 133. This can prevent a "swing" motion from being wrongly detected by acceleration, which is generated in a direction opposite to the swinging direction as described above, together with strength of the swing.

Further, concerning the above calculation of the swinging direction, in the above embodiment, the swinging direction vector is calculated based on difference acceleration for three frames after it is detected that the acceleration exceeds the trigger threshold value. However, the difference acceleration for calculating the swinging direction vector is not limited to such difference acceleration for three frames. For example, a swinging direction vector may be calculated based on difference acceleration at a time when the acceleration exceeds the trigger threshold value and difference acceleration at a frame immediately before that time, or based on difference acceleration at a frame at which it is detected that the acceleration exceeds the trigger threshold value and difference acceleration at one frame before and one frame after that frame. Alternatively, a swinging direction vector may be calculated based on only difference acceleration after several frames from a time when it is detected that the acceleration exceeds the trigger threshold value. In other words, a swinging direction vector may be calculated based on difference acceleration at a frame at which it is detected that the acceleration exceeds the trigger threshold value, or based on difference acceleration at a frame close to that frame.

Further, in the above embodiment, the musical performance game of the orchestra has been described as an example. However, the present invention is not limited to processing for such a game, and applicable to general information processing in which processing is executed based on consecutive "swing" motions of an input device including an acceleration sensor.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing an information processing program that is to be executed on a computing system that includes at least one processor that is configured to process data that is outputted from an acceleration sensor configured to detect accelerations in at least two axial directions, the information processing program comprising instructions configured to:

repeatedly receive acceleration data;

repeatedly calculate a change amount vector based on the received acceleration data;

repeatedly determine whether or not a magnitude of the calculated change amount vector is equal to or larger than a first threshold value;

execute predetermined processing when the magnitude of the change amount vector is equal to or larger than the first threshold value;

calculate a swinging direction based on the change amount vector when the magnitude of the change amount vector is equal to or larger than the first threshold value;

set at least one second threshold value in a direction opposite to the swinging direction after the swinging direction is calculated;

determine whether or not the change amount vector intersects with the second threshold value; and determine whether or not the magnitude of the change amount vector is smaller than a third threshold value which is equal to or smaller than the first threshold value after an intersection of the change amount vector with the second threshold value is determined, wherein after the magnitude of the change amount vector is determined to be equal to or larger than the first threshold value, subsequent determination of a magnitude of a subsequent change amount vector that is equal to or larger than the first threshold value waits for the magnitude of the change amount vector to be determined to be smaller than the third threshold value.

2. The medium according to claim 1, wherein the second threshold is a value of a straight line or a plane that is perpendicular to the calculated swinging direction in a virtual space.

3. The medium according to claim 2, wherein the value is positioned at a position away from an origin of the virtual space and opposite the swinging direction.

4. The medium according to claim 1, wherein calculation of the swinging direction is further based on the received acceleration data which is obtained after a predetermined time period elapses from a time at which the magnitude of the calculated change amount vector is determined to be equal to or larger than the first threshold value.

5. The medium according to claim 1, wherein
the swinging direction is a combination vector and the combination vector is a combination of a plurality of calculated change amount vector for a predetermined time period from a time at which the magnitude of the calculated change amount vector is determined to be equal to or larger than the first threshold value.

6. The medium according to claim 1, wherein the second threshold value is set based on the magnitude of the calculated change amount vector.

7. The medium according to claim 1, where the instructions are further configured to increase the first threshold value based on the magnitude of the calculated change amount vector in accordance with a predetermined time cycle.

8. The medium according to claim 7, where the instructions are further configured to decrease the first threshold value over time after the first threshold value is increased.

9. The medium according to claim 1, where the instructions are further configured to:
calculate an inner product between the change amount vector and the swinging direction; and
compare the inner product with the second threshold value to determine whether or not the change amount vector intersects with the second threshold value.

10. An information processing device for executing processing based on acceleration data which is outputted from an acceleration sensor which detects acceleration in at least two axial directions which is applied to an input device, the information processing device comprising:
a processing system that includes at least one processor, the processing system configured to:
repeatedly obtain the acceleration data;
repeatedly calculate a change amount vector that is indicative of a change amount of acceleration based on the obtained acceleration data;
repeatedly determine whether or not a magnitude of the calculated change amount vector is equal to or larger than a first threshold value;
execute predetermined processing when the magnitude of the change amount vector is equal to or larger than the first threshold value;
calculate a swinging direction of the input device based on the change amount vector when the magnitude of the change amount vector is equal to or larger than the first threshold value;
set at least one second threshold value in a direction opposite to the swinging direction after the swinging direction is calculated;
determine whether or not the change amount vector intersects with the second threshold value; and
determine whether or not the magnitude of the change amount vector is smaller than a third threshold value which is equal to or smaller than the first threshold value after an intersection of the change amount vector with the second threshold value is determined,
wherein after the magnitude of the change amount vector is determined to be equal to or larger than the first threshold value, subsequent determination of a magnitude of a subsequent change amount vector that is equal to or larger than the first threshold value waits for the magnitude of the change amount vector to be determined to be smaller than the third threshold value.

11. A method of determining an action from a series of accelerations detected by an acceleration sensor in a user input device, the method comprising:
repeatedly receiving acceleration data that is detected by the acceleration sensor;
repeatedly calculating, on a processing system that includes at least one processor, a vector based on the received acceleration data;
determining a first movement state when a magnitude of the vector is equal to or larger than a first threshold value;
responsive to determining the first movement state:
executing a predetermined process;
calculating, via the processing system, a swing direction of the action based on the calculated vector;
setting a second threshold value in a direction that is opposite the swinging direction, after the swinging direction is calculated;
determining a second movement state when a value based on the vector intersects with a second threshold value;
determining a third movement state when the magnitude of the vector is smaller than a third threshold value after the second movement state is determined, the third threshold value being equal to or smaller than the first threshold value;
outputting, via the processing system, an animation related to the action onto a display device based on the determined first, second, and/or third movement states,
wherein, after the first movement state is determined, no subsequent first movement states are determined until determination of the third movement state.

12. The method of claim 11, wherein the second threshold value is a straight line or a plane that is perpendicular to the calculated swing direction in a virtual space.

13. The method of claim 11, wherein the second threshold value is further set based on the magnitude of the calculated vector.

14. The method of claim 11, further comprising increasing the first threshold value based on the magnitude of the vector in accordance with a predetermined time cycle.

15. The method of claim 14, further comprising decaying the first threshold value over a period of time after the first threshold value is increased.

16. The method of claim 11, wherein the based on the vector is an inner product between the vector and the swing direction.

17. An information processing system for determining a swing motion of a user input device that includes an acceleration sensor that is configured to detect accelerations in at least two axial directions, the system comprising:
a processing system that includes at least one processor, the processing system configured to:
repeatedly receive acceleration data that is detected by the acceleration sensor;
repeatedly calculate a vector based on the received acceleration data;
determine a first movement state when a magnitude of the vector is equal to or larger than a first threshold value;
responsive to determination of the first movement state:
execute a predetermined process;
calculate a swing direction of the action based on the calculated vector;

set a second threshold value in a direction that is opposite the swinging direction, after the swinging direction is calculated;
determine a second movement state when a value based on the vector intersects with a second threshold value, after setting the second threshold value;
determine a third movement state when the magnitude of the vector is smaller than a third threshold value after the second movement state is determined, the third threshold value being equal to or smaller than the first threshold value; and wherein, after the first movement state is determined, no subsequent first movement states are determined until determination of the third movement state.

* * * * *